US007194730B2

(12) United States Patent
Pramberger

(10) Patent No.: US 7,194,730 B2
(45) Date of Patent: Mar. 20, 2007

(54) SYSTEM AND METHOD FOR THE CONFIGURATION OF SOFTWARE PRODUCTS

(75) Inventor: Johann Pramberger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 09/871,502

(22) Filed: May 31, 2001

(65) Prior Publication Data

US 2002/0040469 A1 Apr. 4, 2002

(30) Foreign Application Priority Data

Jun. 3, 2000 (EP) .................. 00111783

(51) Int. Cl.
*G06F 9/44* (2006.01)
(52) U.S. Cl. .................. 717/120; 717/121
(58) Field of Classification Search ............. 717/120, 717/121, 101, 102, 103
See application file for complete search history.

(56) References Cited

U.S. PATENT DOCUMENTS 6,226,792 B1* 5/2001 Goiffon et al. ............. 717/120
6,256,773 B1* 7/2001 Bowman-Amuah ......... 717/121
6,295,531 B1* 9/2001 Bae et al. ................... 707/4

OTHER PUBLICATIONS

"Software Configuration and Library Manager (SCLM) Product Manager's Guide," IBM, OS/390 Version 2, Release 5.0, Publication No. SG28-1319-02, 316 pages, 1998.
"Getting Started with the Team Connection Clients, Version 3.0," IBM, Publication No. SC34-4552-02, pp. 1-113, 1998.
M. Ishida et al., "BuildTool," Apache Software Foundation, Version 1.0.2, 44 pages, 2000.

* cited by examiner

*Primary Examiner*—Wei Zhen
*Assistant Examiner*—Qamrun Nahar
(74) *Attorney, Agent, or Firm*—Ryan, Mason & Lewis, LLP

(57) ABSTRACT

A common extensible software configuration markup language (XSCML) is provided which is suitable to define a project related to the development or update of a software product. The common XSCML may be based on the Extensible Markup Language (XML). In accordance with the XSCML, a software project definition and a system independent software configuration framework are generated. An XSCML processor is provided to access the project definition and to describe product elements and processes and define their access parameters and their relations among each other.

36 Claims, 11 Drawing Sheets

SYSTEM AND METHOD FOR THE CONFIGURATION OF SOFTWARE PRODUCTS

FIELD OF THE INVENTION

The invention relates to a software configuration system and method for use in a computer system including at least one server which is connected to a plurality of clients. The system and method allow an efficient team cooperation to develop, update, build, promote, test and deliver product elements which are linked together to form different versions of a software package, and they also enable the definition of process and data flows for product elements through the software configuration system from creation and update to delivery.

BACKGROUND OF THE INVENTION

Software Configuration Management (SCM) environments are implemented as a loose set of tools to be combined. They differ with each installation. There is no platform independent technology to combine such tools and libraries under one company defined framework and development process model. Most of the time, the source code handling and control is separate from the compile (build) logic and other tools used. In addition, the source control libraries available maintain their own private format so that a user must perform check-outs and check-ins with regard to a file system. On the other side, the developers always prefer to work with the file system view because there they have the most tools available and it is transparent for the developer. They prefer to do edit, compile (one form of a build), and debug operations with the look and feel of a file system, but also preferably want in the background to have all the advantages of a source control library to enable a team development structure.

One problem of the prior art systems consists of the fact that the known implementations provide proprietary implementations which lack compatibility with other systems. There exist elements on the way to a solution of this problem, but such elements do not provide an open and platform independent definition which enables a unique platform for the use of different operating systems, library implementations and tools. An example of a known system using a declarative approach is represented by the IBM product called "Software Configuration and Library Manager (SCLM)," which is part of the IBM OS/390 operating system family and is described in the IBM publication "Software Configuration and Library Manager (SCLM) Project Manager's Guide," OS/390 Version 2, Release 5.0, publication no. SG28-1319-02, 1998, the disclosure of which is incorporated by reference herein. This product uses proprietary definitions for the elements controlled in a library system and for the functions provided, but it does not provide support for any library system and any operating system. It lacks however a built-in process flow support.

Another known system is represented by a product called "TeamConnection," which is described in the IBM publication "Getting Started with the TeamConnection Clients, Version 3.0," publication no. SC34-4552-02, 1998, the disclosure of which is incorporated by reference herein. "TeamConnection" does not use the declarative approach but contains certain functional elements like tracking approaches, data security and notification. Also, this system does not provide a platform independent support.

Besides, in the known environments, the developers work on a file system to do their jobs and just once in awhile they are interested in synchronizing their source with the back end library system to get the files saved and to update the library system to serve as a base for a common driver. However, the builds are not ensured to be common across all users and back end processes.

Companies which are creating software products for their own business, or selling such products, need a development environment which ensures the following of defined rules and processes for different purposes such as security, quality, reliability and legal subjects, and supports any needed technology. None of the known products allow covering all the technologies and processes needed. However, it would be highly advantageous for existing tools and products, with their functions and processes, to be built into a defined framework to integrate them into one well-defined solution.

SUMMARY OF THE INVENTION

It is an object of the invention to provide a software configuration system and method which allow an efficient team cooperation to develop, update, built, promote, test and deliver product elements which are linked together to form different versions of a software package.

It is also an object of the invention to provide a software configuration system and method which enable a user to define process and data flows for product elements through the software configuration system from creation and update to delivery of a software package.

It is another object of the invention to provide a common configuration markup language for handling a plurality of product elements stored in library systems. The common language is used to access product elements and to determine how the elements relate to each other with regard to inputs, outputs, logical dependencies and specific parameters for the software packages to be developed or updated.

It is a further object of the invention to provide a software configuration system and method which enable distributed team cooperation and build servers, provided by different manufacturers and controlled by different operating systems, to communicate among each other.

It is also an object of the invention to provide a system and a method which permit the use of a central definition for access rules to the data and processes, for the process workflow, problem reporting, notification rules, build rules, promotion rules and edit rules within a software configuration environment in which a plurality of developers are involved who may reside in different locations remote from each other.

In one aspect of the invention, a method comprises the step defining a common extensible software configuration markup language (XSCML) which is suitable to define a project, to perform a memory access to product elements and packages, and for mapping of the processes and tools to one ore more library systems and for defining the relations between the product elements. By using this common extensible software configuration markup language, a system independent software configuration framework is generated to describe the product elements and processes and define their access parameters and their relations among each other.

A system independent software configuration framework according to the invention may be stored in the memory of one or more servers, which have assigned the product elements, processes and tools in the memories. Selected ones of the product elements, tools and processes are called by at least one of the clients attached to the server or servers by using the commands of the common extensible software configuration markup language, while the users may use their own languages to develop, update or test the product elements called. The common software configuration markup language is preferably based on the Extensible Markup Language (XML).

According to another aspect of the invention, a system independent software configuration framework according to the invention may be stored in the memories of a plurality of geographically distributed computer systems which are corrected together through a communication network. Access and administration of the assigned product elements, processes and tools in the locally distributed systems and communication between these systems is performed by the common extensible software configuration markup language, while editing of product elements may be performed in other languages which are independent of the common extensible software configuration markup language.

Using such an inventive approach permits an exchange of product elements with other locations where, in each of the cooperating locations, the same system behavior is provided, even if different implementations are used which may include different file systems and library systems. The local library systems may even be reduced to pure file systems including in a database to hold some meta data for local elements all covered in the Web through Web technologies like WebDAV ("Web-based Distributed Authoring and Versioning," a set of extensions to HTTP (hypertext transport protocol) which allows users to collaboratively edit and manage files on remote web servers).

Further, XSCML based definitions may be processed to create an environment documentation to be printed or accessible via the Web. This leads to environment definitions which, on the one side, describe the technical constructs needed for running the software configuration environment system, but also provide a self documenting approach of the same. To enhance the documentation capabilities, additional XML tags may be allowed similar to the HTML (hypertext markup language) tags to intersect the technical text to provide the commentary of the technical elements, on one side, but also allow to create user and administration documentation, on the other side, from the same source.

DETAILED DESCRIPTION OF PREFERRED EMBODIMENTS

Figure 1:
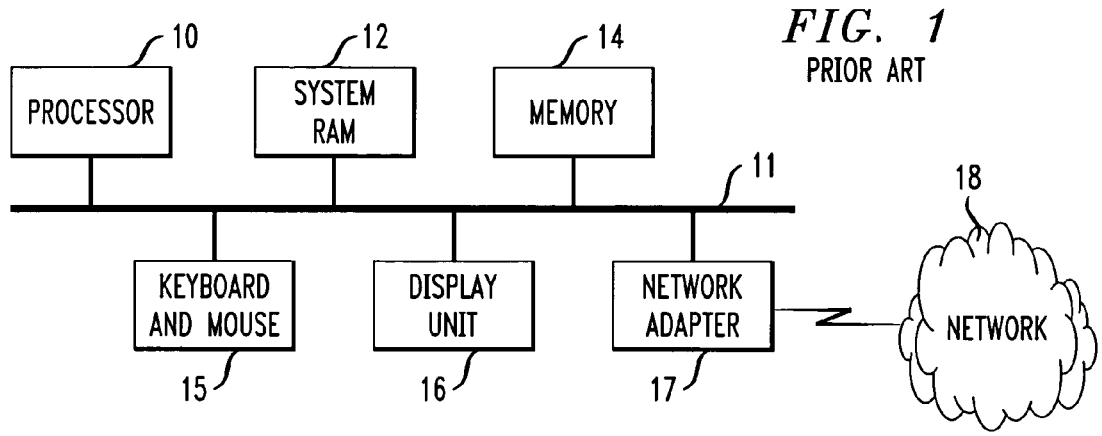
FIG. 1 is a schematic block diagram of a known server computer usable for the implementations of the invention as shown herein.

FIG. 1 relates to a known computer system which operates as a sever within the described embodiment of the invention. The computer system comprises at least one processor 10 which is connected through a data channel 11 to a system RAM 12 and a memory 14 which may be a hard disk storage used to store at least one database of the software configuration system according to the invention. The computer system further comprises a keyboard and mouse unit 15 for the input of data and commands and a display unit 16, both connected to the data channel 11. Furthermore, the system comprises a network communication adapter 17 through which the server may establish a data communication to remote computer systems by means of a digital communication network 18, such as the Internet. The communication adapter 17 also provides data communication to at least one client computer fixedly connected to the server of FIG. 1, and to other server systems which may have a similar design as that one shown in FIG. 1.

Figure 2:
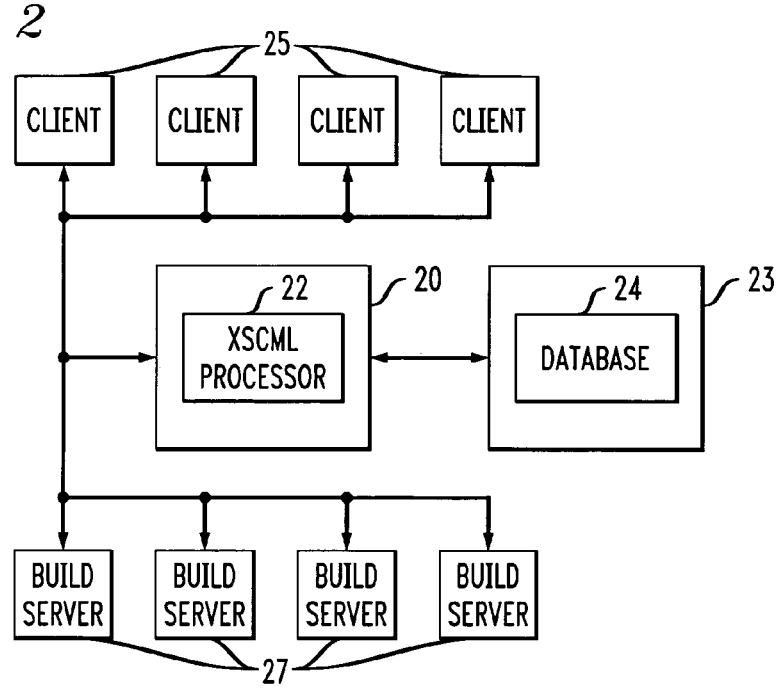
FIG. 2 is a general block diagram of a computer system adapted to execute an embodiment of the invention.

FIG. 2 shows a simplified block diagram of a computer system which may be used to execute an embodiment of the invention. This computer system comprises a first server 20 which corresponds to the server of FIG. 1 and which runs a program called Extensible Software Configuration Markup Language (XSCML) processor 22. The server 20 is connected and controls a memory 23 which contains, beside other items, a system database 24 storing data which is used by the XSCML processor 22. A number of workstations 25 are connected to the server 20 through its network adapter 17, not shown in FIG. 2. The workstations 25 operate as clients of the server 20 and have access to the database 24 in the memory 23 through control of the XSCML processor 22. The computer system of FIG. 2 further comprises a set of second servers 27 which are connected to the first server 20 to exchange data with the first server 20 and to perform access to the database 24 in its memory 14 through control of the XSCML processor 22. The second servers 27 (herein also called build servers) are, in their design, similar to the first server 20 and run compiler or build programs installed in the memories 14 of each of the servers 27. Such a build server may itself have one or more connections to a LAN data server through a communication adapter 17 as shown in FIG. 1 for accessing tools and data.

Figure 3:
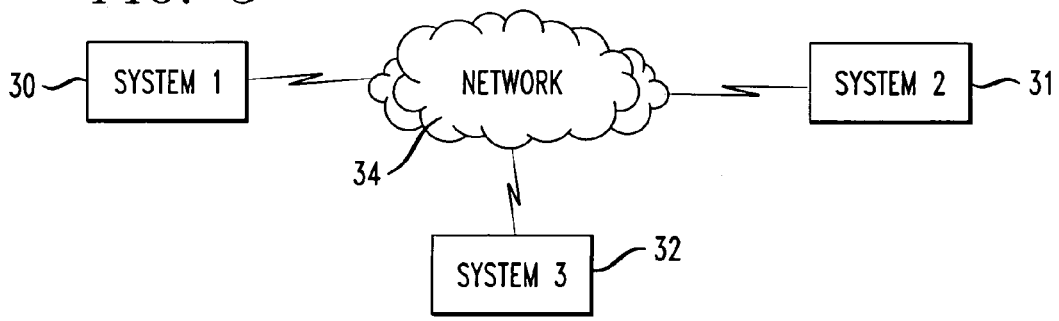
FIG. 3 is a general block diagram of distributed computer systems adapted to execute another embodiment of the invention.

A number of computer systems, each one corresponding to the computer system of FIG. 2, may be distributed and connected via a digital communication network such as the Internet. FIG. 3 shows three such computer systems 30, 31, 32 connected through a communication network 34. There may be far distances between the systems 30, 31, 32. For example, system 30 may be installed in Germany, system 31 in India and system 32 in the USA.

A system and method according to the invention serves to develop and test complex software products, each comprising a plurality of software components herein called software elements which may form different versions of the same software product. Due to the volume and complexity of the product, the software elements have to be developed and tested by a group of developers and separately compiled and linked together to build a package which on its highest level represents the software product. The software product and its elements are the subject of continuous updates and further developments with the effect that there always exist different versions of the same software product and its elements and that at a certain point of time a new version will replace a currently used version of the software product. The development, test and updating of a program product performed in parallel by different people is designated as a project. The invention provides a method and system which allow to manage a project effectively, even if the development, test and updates of the software product elements are carried out at the same time under different environments at different places which have large distances from each other.

Figure 4A:
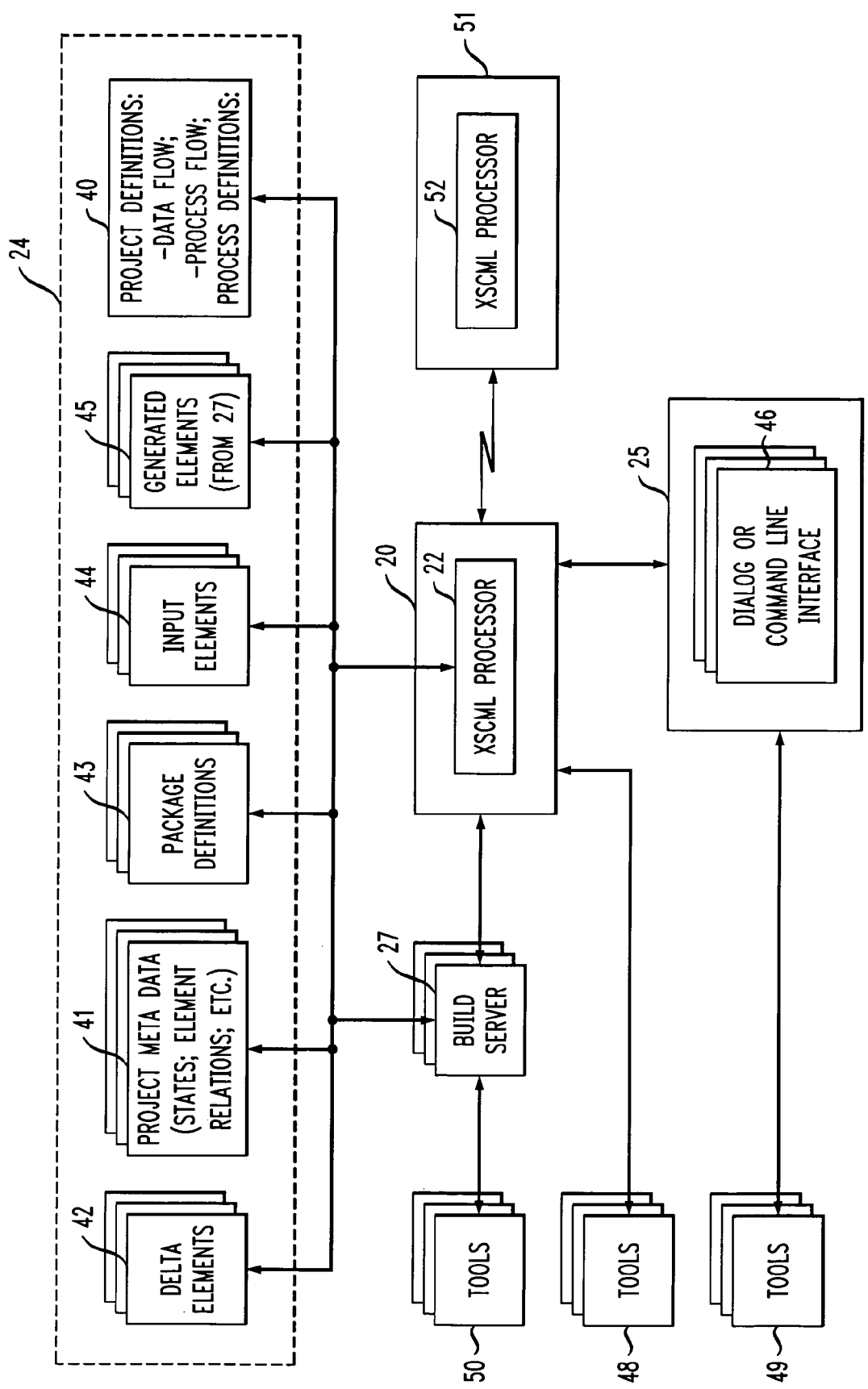
FIG. 4A is a schematic block diagram of a software configuration system according to the invention.

A central component of the system according to the invention is the XSCML processor 22 which administrates the software elements, its various versions and relationships, and controls accesses to the database and the processes and tools available to the system. FIG. 4A shows the components of the system which are controlled or used by the XSCML processor 22. A part of the components are data sections 41-45 which are included in the database 24. These components comprise sets of project meta data 41 which include data representing the state of the various software elements and their relations among each other. Further components are a plurality of product elements section 42 containing software delta elements documenting changes to elements under development or the subject of update operations. A product and package definitions section 43 is assigned to a plurality of product elements which may belong to different product versions. An example of product element definitions is described below. A set of input elements 44 and generated elements 45 are linked to the package definition block section 43. The XSCML processor 22 has further available project definition data 40 which comprises data flow definitions, process definitions and process flow definitions. Another component of the system is a set of dialog or command line interfaces 46 which are used by the XSCML processor 22 as user interfaces or command application interfaces and which are distributed to the client workstations 25. The XSCML processor 22 may establish a connection to the build servers 27 which is able to run one of a number of compilers installed on server 27 or stored on a tool server 50. The XSCML processor 22, the client workstations 25 and the build server 27 each have a set of tools 48, 49 and 50 available for performing the activated processing steps. The XSCML processor 22 may also be connected, for example, via a communication network to another XSCML processor 52 running on another server 51 at a remote location to allow team cooperation in the development, test and updating of software projects as will be explained in connection with FIGS. 3 and 10.

The database 24 stored in the memory 23 and containing the components 40–45 forms the library system of the XSCML processor 22 which provides a descriptive set of definitions in an Extensible System Configuration Markup Language (XSCML). This language allows to be used for generating common definitions of all components contained in the library system and is used by the servers 20, 51, 27 and the clients 25. The XSCML processor 22 performs the access to the components 40–45 and the underlying mapping of these components to the library system. It also calls the available processes applied to the product elements stored in the library system. The XSCML processor 22 identifies the product elements themselves and their relations to each other in terms of inputs, outputs and logical dependencies and specific parameters of the software packages to be handled, such as applications, fixes, or work elements. Furthermore, the common definitions provided by the XSCML processor 22 are also used for the description of the access rules for data and processes, the process workflow, the problem reporting, the notification rules, the promotion rules, build rules and the edit rules.

Figure 4B:
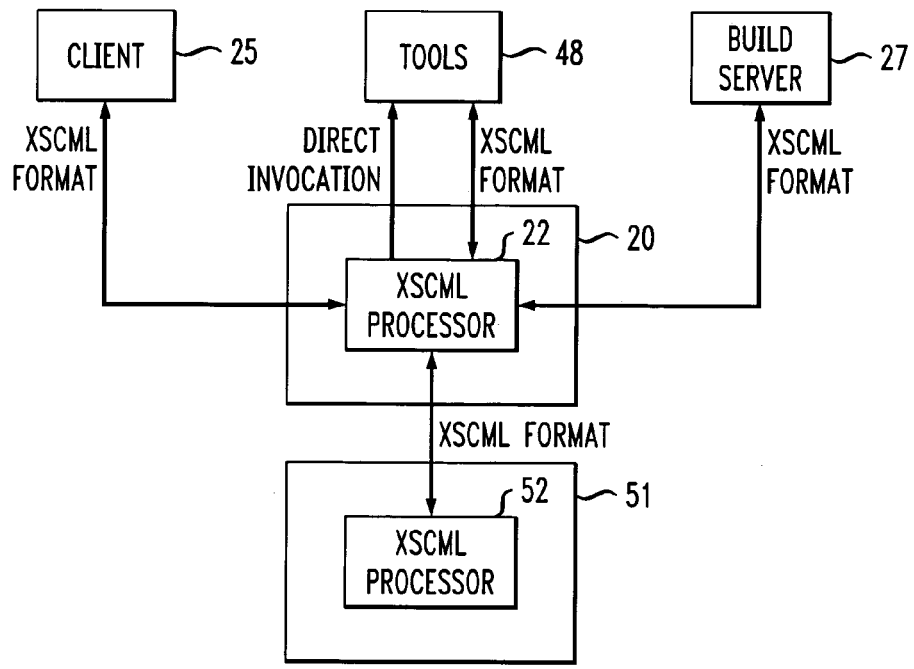
FIG. 4B is a schematic block diagram of the data flow between main components of a system according to the invention.

FIG. 4B shows the communication between the main components of the system according to FIG. 4A. XSCML processor 22 which runs on the server 20 is connected to at least one client 25, at least one build server 27 and tools 48. Furthermore, XSCML processor 22 is connected to XSCML processor 52 which runs on the server 51. The communication between the XSCML processor 22 and the components 25, 27, 48 and 52 takes place by data streams in the XSCML format. These data streams comprise product elements and packages as well as project definition and process definition data, status data and commands such as the call command for a selected one of the tools 48.

By using the common extensible software configuration markup language, the XSCML processor 22 is able to provide control of the product elements which includes:
change control which keeps track of changes of the product elements over different versions of the product and parallel access of elements by different persons;
version control which stores and retrieves different iterations herein also called delta elements 42 of the product elements;
item management to create, track and manage problems and features;
process control to define and follow a sequence of steps which take an organization through the development process in a predefined way with defined tasks to the persons involved in that process; process control also addresses the data flow and progress flow;
build management which provides an automation of the translation of product elements 44 and 45 into other forms 45;
packaging to extract data for delivery of the product out of the system library and to bring the product in a defined format for delivery.

The common extensible software configuration markup language XSCML is preferably based on the syntax of the well-known Extensible Markup Language (XML) for several reasons:
XSCML allows to use problem oriented syntax but based on a standard;
XSCML includes in its concept the WEB integration which means that references to product elements could not only be within a database or file system but also reference to any element accessible through the WEB via a WEB server could be established if needed;
there are already a plurality of tools around which support the parsing and graphical representation of XML implementation and also XML applications based using XML syntax like WebDAV which can be used in the implementation of an XSCML framework;

XSCML is defined as platform independent especially if the programming language JAVA will be used for the parser and logic;

XSCML provides the capability of transformation between flavors of different XSCML applications;

XSCML allows to generate self documenting applications which are human readable on the screen or as printed materials or to be used for distribution or publication by means of the Web.

The XSCML does not force the developers to use XML for the software development and update work. In accordance with the character of XSCML, the content of each product element is independent of the configuration steps controlled by the XSCML processor 22. Thus, the development of the product elements can be performed in any native language. Graphic user interfaces may facilitate the use of the XSCML defined information.

Working with Product Elements

As already mentioned, there are two ways to look to the environment from a developers perspective. The one is to work with files on a file system using an organization with directories or looking to a library system to work with. Instead of files, an object paradigm may be applicable which extends the widely used file system paradigm and wherein the files and directories are treated as special objects. For simplicity, the file system paradigm will be used in the following. In practice, the developers actually work primarily on a file system base, because they have the most flexibility to use different tools. The library view is only important to have a save repository to store data so that the work results are saved.

In practice, the developer works on projects which means that for a certain project the developer has a static view on the project as long as the project is alive and he is interested to have available reproducible data during this period. The known methods to perform the development of software projects do not solve the relationship and promote between the hierarchy of the software elements and the developer team development environment. If such approach is extended to a team of developers where each developer uses a single user based development workframe product, each project of a developer is mapped to a directory of data memory accessible through a LAN (local area network), for example, where common drivers are integrated on a common LAN directory.

Figure 5:
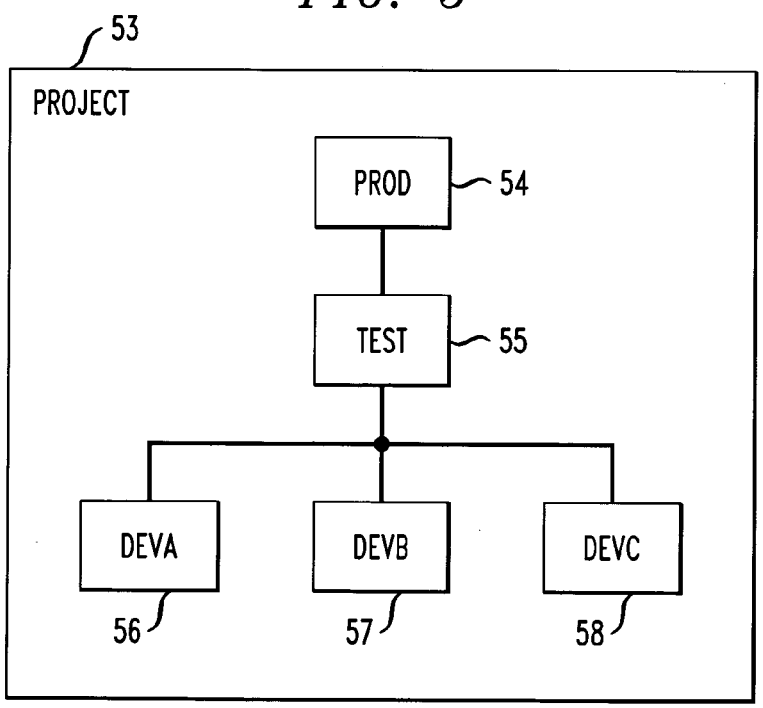
FIG. 5 is a block diagram of a simplified example of a logical project view history defining the data flow of elements.

This leads to the structure 53 as shown in FIG. 5 wherein the team produces in three parallel workframe products DEVA, DEVB, DEVC product elements. This work is then the subject of a test operation, i.e., in a LAN directory TEST, the result of which is the final product, i.e., in a LAN directory PROD. Such directories are herein also called groups. A basic rule is that only in the bottom groups, modification must be done. As shown in FIG. 5, product elements can only be moved to PROD 54 from TEST 55, and elements can only be moved to TEST 55 from DEVA, DEVB or DEVC. Edits can only be done through DEVA, DEVB and DEVC. The blocks 54–58 represent data sets stored in the database or in the memories 14 of the client workstations.

Important is that at the same time the same element of a product developed in a structure like FIG. 5 can exist in different modification instances in all blocks 54 to 58.

It is also important to understand the different type of groups in such a structure which is described below and also shown in the Table 1:

Edit group: These are always the lowest groups in a group hierarchy. Creation and changes of elements can only be made in such edit groups through client programs via XSCML APIs (application programming interfaces) or XML streams.

Transition groups: These are groups which have one or more lower groups in the tree to receive packages. It has just one higher group in the hierarchy to promote packages further on.

Target group: These groups are the same as the transition groups, but are not allowed to promote packages to its higher groups, if available.

Baseline groups: These groups are the same as the target groups, but the packages are freezed which means that no promotions from lower groups and to higher groups are possible. In other words, editable members in those groups can never be changed.

TABLE 1

|  | Number of from groups | group actions | to groups |
| --- | --- | --- | --- |
| Edit group | 0 | edit (check-in, check-out) build, promote, query | 1 |
| Transition group | 1 to n | build, promote, query | 1 |
| Target group | 1 to n | build, query | 0 to 1 |
| Baseline group | 0 to n | query | 0 to 1 |

With regard to this situation, the invention defines software projects by an XML approach. In the following, it is assumed that a client obtains project elements or data from an XSCML system through an XSCML project definition which indicates which files in file system should be processed and which libraries are connected to the directories to control the content and the movement of the files within the file system.

The project definition contains three major sections:

Data flow definition: Those tags define the logical data representation together with the physical data mapping stored in the real product using the XSCML processor paradigm. It includes the project, group, type, file, element notation. This major section is shown below in Example 1.

Process flow definition: Those tags define the order of process states intersecting with the data flow. Each process state may even trigger some data flow activities, like build, promote or create delta version of element or packages. This is shown below in Example 2.

Process definitions: Those tags define the actions steps associated to elements for user actions as edit, build, promote. This is shown in Examples 7 and 8.

Files are always in an XSCML protected mode dependent on the file system capability which is at least a read only attribute. Updates are only done through an XSCML processor triggered by the client. The library system implementing an XSCML processor may hold a complete copy of the current product version as in the file system for recovery reasons. This copy is not seen by the client who has the perception that he is working with an underlying file system. To hide the client from different possible file mapping, a logical naming concept is provided to work with. In a simple project, the logical to physical mapping could be a one to one mapping. This concept may be as follows:

Project: This is an undertaking with prescribed objectives, magnitude and duration. A project may be the development of a software product or an update of an existing software product. For a project, the client may know, through a defined mapping, the root directory he is working with.

Group: A set of project data sets of the element hierarchy. The client may know via the defined mapping the sub directory following the root directory which is ideally the same as the group name. A group defines an active version of defined quality of a product.

Type: A type categorizes elements of a project like modules, macros, object code, listings and load modules. The client may know, via the defined mapping from logical to physical name, the extension of file belonging to a Type or the directory name of a Type.

Member: This identifies a data set or product element, or contains several elements and serves as its symbolic address. It is the atomic item managed by the file system of an underlying operating system. A member has an XSCML language assigned.

Element: The atomic unit to be managed by an XSCML system. It could be a one to one relation between element and member where an element is the same as a member. The scope of an element is defined by the development language, products and tools used in an XSCML system. An element has an XSCML language assigned.

Language: This is a process definition defined in XSCML syntax which describes the tools invoked at certain XSCML actions triggered by the clients and related to packages, members or elements.

Besides the data definition actions, a set of actions is available to establish the XSCML framework and to apply that action to the data assigned to XSCML framework by the project definition.

Such actions are at least:

Edit: Edit actions apply if the user creates or changes the content of an element in the XSCML system. A predefined action of Edit is normally a parse for dependencies or for other statistical information of the source code, or for synchronization of update actions to elements. This action is either invoked by an editor used by the developers or corresponds to the action check-out to lock a member for edit and check-in to bring the changed member back to the XSCML system.

Build: Build actions apply if the user issues the build function against a package which itself may contain other packages. The XSCML system will then invoke, for each referenced element in the package hierarchy, the predefined actions defined by the language in the process definitions. The predefined action of Build covers all steps to transform one or more source code elements to one or more output elements.

Promote: Promote actions apply if the user issues the promote action against a package which itself may contain other packages. The XSCML system then moves all elements related to a successfully built package or referenced packages in a package hierarchy up to the next higher group defined in the XSCLM system.

The actions are described later with reference to FIG. 14. The actions themselves are defined in XSCML syntax to be passed to the XSCML processor for execution. Such definitions may, for example, read as follows:

```
<EDIT PROJECT="PRODUCTA" "GROUP=DEVA" FILE="HELLO.CPP"/>
<BUILD PROJECT="PRODUCTA" "GROUP=DEVTA" TYPE="CPP_PKG"
    FILE="HELLO" MODE="NORMAL"/>
<PROMOTE PROJECT="PRODUCTA" "GROUP=DEVTA" TYPE="CPP_PKG"
    FILE="HELLO" MODE="UNCONDITIONAL"/>
```

The actions are common across the underlying implementing products of the XSCML framework. Thus, the mapping to the real commands are provided through the project definitions as shown in Example 1 in the section where the database related definitions are specified. Such mapping may, for example, take place as follows:

```
...
<DB>
...
<Mapping>
...
    <ACTION_MAP ACTION="EDIT" GROUP="*" TYPE="*">
        <CMD>LPEX </CMD>
        <PARMS>##FILE##.... </PARMS>
    </ACTION_MAP>
    <ACTION_MAP ACTION="BUILD" GROUP="*" TYPE="*">
        <PARM_MAP KEY="MODE"
            NORMAL C
            C     C
            FORCED F
            REPORT R
        </PARM_MAP>
        <CMD>FLMCMD BUILD,</CMD>
        <PARMS>##project##,##group##,##type##,##file##,,,
            ##MODE##,...
        </PARMS>
    </ACTION_MAP>
        ...
        <MAPPING>
        ...
</DB>
```

Based on such definitions, a build command issued my be mapped to "FLMCMD BUILD,PRODUCTA,DEVTA, CPP_PKG ,HELLO,,,C,...

If a file gets created, the logical elements: "project," "group," "type" and "element" must be specified. The physical names are then dropped by the project definitions.

An XSCML element is identified by a dot notation like "name.ext" where "name" relates to the element name itself and "ext" specifies the implicit container where the element may exist. The container may be explicitly defined in more detail by using an extra type definition. So <SINC TYPE="src">hello.cpp will define an element "hello" in a container named "src". In the mapping rules, the use of "ext" and "TYPE=" is specified.

For files to be managed on a workstation, if no complicated mapping is needed, the logical view leads directly to the physical view of:

&root;\##project##\##group##\##member##.##type##.

For datasets on a OS/390 system, the logical view leads directly to the physical view of:

project##.##group##.##type##(##member##)

For the granularity of elements, a type dependent mapping is available which is dependent on the editor to be used to manipulate such elements stored in the unit of a member.

This is the preferable approach because it is intuitive to the developers. If the update is done through the XSCML client, then the root could even be a local fix disk storage of the developers if customized in the project. There are options of using the groups. The contents of the groups may contain only the needed differences along the hierarchy or the groups may contain a fill copy of the packages the developer is working on. In the last case, the developer is able to work standalone and synchronize with the underlying file system in the database if the client is online again. However, this requires more logic for reconciliation or replication.

According to the invention, even if a different mapping of logical and physical names is done for elements, they are always presented to the user under the terms "project," "group," "type" and "element." This is shown in the subsequent Example 1 which relates to an XSCML system of a software product the name of which is "My Product" and includes those definitions of the XSCML which are used to define the XSCML system. The first part of the example shows the data flow syntax followed by a mapping of the logical types, and thereafter the mapping of the product elements to the physical memory. It follows the process flow and finally the language definition or so-called process definition. The examples are self-documenting and are based on FIG. 10:

EXAMPLE 1

Editing of the Software Product "My Product"

```
<!DOCTYPE PROJECT [
<!-- Physical file directories to be used -->
<!ENTITY root "\\producta\rell">
<!ENTITY tester "\\test\producta\rell">
<!ENTITY product "producta">
]>
<PROJECT NAME="MY Product">
    <!-- It follows the group hierarchy definition which is the
    logical view on a physical directory structure. The physical
    mapping is described later. In the simplest way, the group
    name is a subdirectory to a root directory, where the
    root directory is common to all groups and relates to a
    project. -->
    <GROUP NAME="PROD" DB="PRODLIB" AC="REL" FILEMAP="M0"/>
    <GROUP NAME="TEST" DB="TESTLIB" AC="REL" PROMOTE="PROD"
    FILEMAP="M1"/>
    <GROUP NAME="DEV1" DB="DEVLIB" AC="REL,TEST" PROMOTE="TEST"
    FILEMAP="M2"/>
    <GROUP NAME="DEV2" DB="DEVLIB" AC="REL" PROMOTE="TEST"
    FILEMAP="M2"/>
    <GROUP NAME="TEAMT" DB="DEVLIB" AC="REL,TEST" PROMOTE="TEST"
    FILEMAP="M3"/>
    <GROUP NAME="TEAM" DB="DEVLIB" AC="REL,TEST" PROMOTE="TEAMT"
    FILEMAP="M3"/>
<!-- It follows now the logical types known to the project,
which have a physical mapping dependent on the
environment the source exists.-->
<TYPE NAME="CPP">
<!-- There may be additional tags for some more detailed
mapping or specifications to a physical representation -->
</TYPE>
<TYPE NAME="HPP"></TYPE>
<TYPE NAME="H"></TYPE>
<TYPE NAME="OBJ"></TYPE>
<TYPE NAME="LST"></TYPE>
<TYPE NAME="EXE"></TYPE>
<TYPE NAME="DLL"></TYPE>
<TYPE NAME="CPP"-link></TYPE>
<!-- It follows the association which database and elements
in the database does manage the group contents with regard
to state and content. If several databases would be
possible, there must be a synchronization done between those
databases defined by this project definition. Parts managed
in such a way may only be modified through such a project
definition and not by using the database interfaces
directly. Only a read access to such elements through the
database interface may be allowed. -->
<DB NAME="PRODLIB">
    <!-- Here comes some more specific information where to
    find the related database system like TC Family, SCLM
    project, etc., to hold the data or meta data to control the
    content of the file system described by the project. It
    may define also the degree of versioning done in the
    database, i.e., for groups and types or association of
    groups to processes or states. Also, logical to physical
```

-continued

```
      mapping is defined here -->
      <MAPPING>
          <ACTION_MAP...>
          ...
          <ACTION_MAP...>
          ...
      </MAPPING>
<FILEMAP NAME="M0">
      <!-- Here comes the detail mapping how files should be
      realized on file system based on the logical access using
      the group and type specification. It is assumed that a
      string like ##var## are variables defined through the XML
      syntax. Like ##group## maps to the value of GROUP
      parameter of the <groupmap ...> tag
      -->
         &root;\##group##\##member##.##ext##
</FILEMAP>
</DB>
<DB NAME="TESTLIB">
      <MAPPING>
          <ROOTMAP FILE_ROOT="\\product\product\"/>
          <GROUPMAP GROUP="*" FILE_GROUP="*\"/>
          <GROUPMAP GROUP="PROD1" FILE_GROUP="production\"/>
          <TYPEMAP TYPE="c_type" FILE_TYPE="src\cpp"
          FILE_EXT="cpp"/>
          <TYPEMAP TYPE="*" USE_EXT="EXT"/>
      </MAPPING>
<FILEMAP NAME="M1">
         &tester;\##group##\##name##.##ext##
</FILEMAP>
</DB>
<DB NAME="DEVLIB">
      <MAPPING>
         <ROOTMAP FILE_ROOT="PRODUCT."/>
         <GROUPMAP GROUP="*" FILE_GROUP="*."/>
         <GROUPMAP GROUP="PROD1" FILE_GROUP="PRODUCT1\"/>
         <TYPEMAP TYPE="cpp_type" FILE_TYPE="SRC"
            FILE_EXT="CPP"/>
      <MAPPING>
         <FILEMAP NAME="M2">
            ##root##.##group##.##type##$##ext##(##name##)
         </FILEMAP>
         <FILEMAP NAME="M3">
            TEAMDEV.##group##.##type##$##ext##(##name##)
         </FILEMAP>
</DB>
<PROCESSFLOW>
...
</PROCESSFLOW>
      <!-- Here comes now the process definitions so-called
languages which will be discussed later
      -->
      LANG...>
      ...
      </LANG>
      <LANG ...>...</LANG>
      <ACCESS>
      ...
      </ACCESS>
      </PROJECT>
```

As an alternative to the definition of the data flow, the hierarchy of the product elements may be defined by a work flowtree. This is shown in the subsequent Example 2 wherein two users and one team are cooperating in the development and testing of a software product which results from the flowtree which comprises the following flow groups. The example relates to FIG. 6.

EXAMPLE 2

XSCML Syntax for the Dataflow Defined as Flow Tree:

```
<DOCTYPE FLOWTREE []>
<!-- The data flow hierarchy -->
<FLOWTREE>
```

```
<FLOW LEVEL="PROD1" ACC="P1"/>
<FLOWGROUP>
    <FLOW LEVEL="FIXPROD1" ACC="T"/>
    <FLOW LEVEL="FIXTEST1" ACC="T"/>
</FLOWGROUP>
<FLOWGROUP>
    <FLOW LEVEL="PROD2" ACC="R"/>
    <FLOW LEVEL="STEST2" ACC="R"/>
    <FLOW LEVEL="FTEST2" ACC="R"/>
    <FLOWGROUP>
        <FLOW LEVEL="DEVAT" ACC="R,T"/>
        <FLOW LEVEL="DEVA" ACC="R,T"/>
    </FLOWGROUP>
    <FLOWGROUP>
        <FLOW LEVEL="DEVTB" ACC="R,T"/>
        <FLOW LEVEL="DEVB" ACC="R,T"/>
    </FLOWGROUP>
    <FLOWGROUP>
        <FLOW LEVEL="TEAMT" ACC="R,T"/>
        <FLOW LEVEL="TEAM" ACC="R,T"/>
    </FLOWGROUP>
</FLOWGROUP>
</FLOWTREE>
```

Software Elements and Packages

It is required to define a package with regard to its input and output and which parameters can be passed to the different processes needed to proceed from the input(s) to the output(s), also called generated elements. A package definition can be implicitly defined through an element by means of the process definition associated to an element.

Package: A package may be treated as an element in the database and defined via tags which describe the explicit relation between input elements and generated elements. The tags also define the process definition associated to treat the input element and generate the elements from input elements. They may further define package parameters which are passed to the associated process steps in the process definitions. Some of the package definitions may be defaulted through the project definitions or meta data associated to elements referred to in the package. This means that an input element may be an implicit package definition if the associated process definition contains all the package definitions as default values, such as types for generated elements, explicit dependencies, parameters to process steps, etc. A package may refer to other packages as dependent packages to be processed before the referring package.

The fact that packages may refer to other packages results in a build tree and promote tree of such packages. A build tree of this type can define the complete product to be processed through one build action, and it shows the dependencies between packages and elements.

Besides the explicit dependencies between elements defined through packages, there are implicit dependencies which are found by the XSCML defined processes either after a save of editable elements or after a build of an element. To determine such implicit dependencies, the process definition defines the invocation of the tools to find and store the dependency information.

To enable the users to define the build steps, they must be able, besides defining the package content, to define several builders as one unit and define the information for creating the packages to be handled in one unit. The users are able to create such a unit through a textual representation which could then be used for a graphical representation. In addition, the creating step may be supported through a graphical user interface.

The method provided by the invention to define build steps and packages reduces the complexity of the build tree to a minimum. The packages are the only nodes in the build tree. One package however may be represented through expansion as a number of separate trees to show the input, outputs and include hierarchy. Common parameters (e.g., compile options, common includes) can be hold as separate elements and included through the XSCML syntax into different packages. Furthermore, reusing of defined builders for different projects becomes simple, because it is possible to create builders with more flexibility (e.g., file extensions does not have to be specified in the builders).

Builders with more than one build step can be implemented through the XSCML language with several build steps as shown in the following examples. The multiple step processes are defined through one build script. No programming skill (REXX, C++, JAVA, PEARL) is necessary to implement such process integration.

BUILD Action Against Packages

The IBM publication "TeamConnection Users Guide," publication no. SC34-4499-04, page 183, FIG. 58, contains a sample build object model for msgcat.exe. Reference is made to this example for the subsequent description of the XML based definitions for the build function and the package definition of three types of packages. In this description Examples 2, 3 and 4 are represented which are related to the build of a package by the compilation of two elements with a subsequent link operation. These examples include the definition of the work units and packages as used for the compilation steps of two elements where the results of which are linked to a high level package.

We distinguish between:

1. Compile packages for compile transformations, called (C) packages.
2. Link packages for link transformations, called (L) packages. Link packages may refer to (C) or (L) packages.
3. High-level packages describing applications and sub-applications, called (HL) packages. High-level packages may refer to (C), (L) or (HL) packages.
4. Include packages to share common information across packages, called (I) packages. Include packages may be part of (C), (L), (HL) or (I) packages.

EXAMPLE 3

Use of the Compile Package hello.cpkg to Compile the Source Code hello.c:

```
<!DOCTYPE CPKG[<!ENTITY parmset1 "<PARM1> /Fo+ <PARM1>">]>
<!-- The (C) package unit which defines input and outputs elements and processing
parameters -->
<CPKG NAME="hello" TYPE="cpp_compile">
    <!-- LANG="CPP" defines parser and the set of builder steps
    to be used for the related input member when actions such
```

-continued

```
       as build against it will occur. If omitted than the
       language associated to the input member will be used
       instead. -->
       <LANG NAME="CPP" />
       <!-- The input member to be processed -->
       <SINC type="CPP_NT">hello.cpp</SINC>
       <!-- The output members to be produced by the defined
       builder steps in the language -->
       <OBJ>hello.obj</OBJ>
       <LIST>hello.lst</LIST>
       <!-- The parameters to be passed to the different builder
       steps defined in the language -->
       <PARM1>/L+ /Ti+ </PARM1>
       &parmset1;
   </CPKG>
```

EXAMPLE 4

Use of the Compile Package bye.cpkg to Compile the Source Code bye.c:

```
<!DOCTYPE CPKG[
<!ENTITY parmset1 "<PARM1>/Fo+ <PARM1>">
]>
<CPKG NAME="bye" TYPE="cpp_compile">
    <LANG NAME="CPP" />
    <SINC type="CPP_NT">bye.cpp</SINC>
    <OBJ>bye.obj</OBJ>
    <LIST>bye.lst</LIST>
    <PARM1>/L+ /Ti+ </PARM1>
    &parmset1;
</CPKG>
```

The code compiled in the examples 3 and 4 are linked to create a package. This is shown by Example 5.

EXAMPLE 5

Link Package msgcat.lpkg to Create Package msgcat.exe:

```
<!DOCTYPE LPKG[<!ENTITY parmset1 "">]>
<!-- The package unit which defines input and outputs -->
<LPKG NAME="msgcat" TYPE="cpp_link">
    <!-- LANG="LINK" refers to the set of builders to be used for the related input
    member when actions such as build against it will occur. If omitted a default language
    will be assumed, such as "link", to be defined to TC via a language definition defined
    below. -->
    <LANG NAME="LINK">
        <!-- Creates references to input member to be processed based on keywords in the
        referenced entities -->
        <KEY REFS="OBJ LOAD"/>
        <!-- References to the compile packages to generate a response file in the language
        link -->
        <INCL NAME="hello" TYPE="cpp_compile"/>
        <INCL NAME="bye" TYPE="cpp_compile"/>
        <CMD> input command statements to the linker </CMD>
        <CMD> input command statements to the linker </CMD>
        <ALIAS> msgalias </ALIAS>
        <!-- The output members to be produced by the defined builder steps in the language
        -->
        <LOAD>msgcat.exe</LOAD>
        <LIST>msgcat.map</LIST>
        <!-- Here are currently no parameters to be passed to the different builder steps
        defined in the language -->
        <PARM1> </PARM1>
        &parmset1;
</LPKG>
```

In the following Example 6, the definitions for the whole application by using a high level packaging are described.

EXAMPLE 6

Using High Level Package Prod1.hpkg for Describing the Whole Application msgcat

```
<!DOCTYPE HPKG[
]>
<!-- The package unit which defines input and outputs -->
<HPKG NAME="PROD1" TYPE="app">
    <!-- References to the link packages -->
    <INCL NAME="appl" TYPE="app"/>
    <INCL      NAME="msgcat"      TYPE="cpp_link"/>
```

```
        <INCL NAME="gui" TYPE="gui_compile"/>
    </HPKG>
```

So far, we defined the package contents through XML based definitions. However, the package also refers explicitly to the languages being used for each package which contain the related predefined actions to be performed in detail when a user works with the package during an edit, build or promotion to a higher development stage. A predefined action for an edit may be parsing for dependencies, and for a build, the different build steps to transform the input(s) into the output.

Process Definitions—Collection of Predefined Actions Applied to Packages

The XSCML project definitions contain any predefined action which a user can apply to packages. Such actions comprise Edit, Build and promote like actions to bring the package from one integration state to another. The most basic actions the user may apply are Edit and Build.

The predefined action of Edit is a parse for dependencies or for other statistical information of the source code, or for synchronization of actions. The predefined action of Build covers all steps to transform one or more source code elements to one or more output elements.

In the examples considered herein, two processes are used. One process is used to do the C++ compile and the other to do the LINK. Both processes contain only one build step.

If more build steps are needed to get the build outputs, several steps of TYPE="BUILD" have to be described. In this case, the generated outputs from the first step have to be indicated as input to the next step. An example of such case, which is typically for an OS/390 build, is shown below.

To allow a specific treatment of files especially in a language with several process steps, different IOTYPE keywords are defined for the inputs and outputs. Such information is then used by the builders to allow the special treatment of the associate files:

IOTYPE=S: Used for input data that is specified with a <SINC ...>tag. It means the files or data sets do exist and must not be created by the builder.

IOTYPE=I: Used as an allocation information to get access to additional files needed during the associated process defined in a <SCRIPT ...>tag.

IOTYPE=O: Used for output data that is specified with tags like to <OBJ . . . >, <LIST ...>, <LOAD ...>, <OUTx ...>. Data sets or files are created during the build. The output is stored in the element storage of the system after a successful build.

IOTYPE=W: Used for work data set needed for temporary use in one step or even succeeding steps in multistep processes. The output is, however, not stored after a successful build.

IOTYPE=N: Used in an OS/390 language to define a dummy entry & 0{f or a ddname list to be passed to the program called.

IOTYPE=A: Used for data sets or files which do already exist and are referred to from the build steps. They are normally not created by a related process during a process step and may contain or not contain information stored in the element storage of the system.

Other IOTYPE keywords may be defined.

The related process c-comp.lang for the language C++ can be defined as follows:

EXAMPLE 7

```
<CLANG NAME="C" env="NT" Version_id="3.6.0">
    <INCLUDES ID="hfiles">
    <!-- steps active during the parse of parts -->
    <!-- LIB="YES": TeamConnection controlled header files, identified by a TYPE
attribute provided for -->
    <!-- LIB="NO" :system header files, not controlled by TeamConnection-->
        <INCLUDE PATH="src/include" LIB="YES"
TYPE="h_inc" />
        <INCLUDE PATH="src/package" LIB="YES"
TYPE="h_pkg" />
        <INCLUDE PATH="." LIB="YES" TYPE="h" />
        <INCLUDE PATH="sys/c" LIB="NO" />
    </INCLUDES>
    <STEP TYPE="PARSE">
        <SCRIPT name="parse_c"/>
        <PARMS> -SOURCE ##source## -IDRS ##INCLS## -DEPFILE
##deps##</PARMS>
        <FILE ID="source" KEYREF="SINC" />
        <FILE ID="incls" REFID="hfiles" />
        <FILE ID="deps" NAME="csource.deps" />
    </STEP>
    <!-- steps active during the build of parts -->
    <STEP TYPE="BUILD">
        <SCRIPT name="icc"/>
        <PARMS KEYREF="PARM1">/Fo:##objects##/F1:##listing## /I ##includes##
##input##</PARMS>
        <RC cond="<=" val="4"/>
        <!-- PRINT=YES indicates that the output should
        also go to the build message even when build
        fails -->
        <FILE ID="input" KEYREF="SINC" IOTYPE="S"/>
        <FILE ID="object" KEYREF="OBJ" IOTYPE="O"/>
        <FILE ID="listing" KEYREF="LIST" IOTYPE="O" PRINT="YES"/>
        <FILE ID="includes" KREYREF="INCL"
```

-continued

```
        REFID="hfiles"/>
    </STEP>
</CLANG>
```

The related process c_link.lang for the language LINK can be defined as follows:

EXAMPLE 8

```
<LLANG NAME="LINK" env="NT" Version_id="3.6.0">
    <!-- steps active during the build of parts -->
    <STEP TYPE="BUILD">
        <SCRIPT name="ilink"/>
        <PARMS KEYREF="PARM1"> /OUT:##out## /MAP:##map## objects</PARMS>
        <RC cond="<=" val="4"/>
        <!--list of input and output files-->
        <FILE ID="objects" KEYREF="INCL" IOTYPE="S"/>
        <FILE ID="out" KEYREF="LOAD" IOTYPE="O"/>
        <FILE ID="map" KEYREF="LIST" IOTYPE"O"/>
    </STEP>
</LLANG>
```

The examples are not exhaustive but are provided to disclose the principles to specify a complete build which enables a user to generate parsers and builders which contain no environment specific information but get all passed via parameters or environment variables based on the XSCML definitions and meta data stored in the XSCML memory.

Process Definitions for a Package with a Multistep Language

The following example shows how more complex languages are implemented with XSCML. The example is based on a OS/390 Transformation with the following build steps:

1. CICS preprocessor to translate the EXEC CICS statements into C++ procedure calls.
2. C++ compiler is called to do the real compile to create the object.
3. The final step collects all the listings produced before from CICS and C++ into one listing which is stored as one entity.

The central definition of the compile parameters can be extracted from the compile package, stored in an additional part of the database and referenced in the compile package:

```
cics.parms
    <PARM1> MAR(1,80) OM(1,80) </PARM1>
c370.parms
    <PARM2> LIST AGGREGATE </PARM2>
```

The compile package cicspart.pkg is used to build cicspart.mod:

EXAMPLE 9

```
<!DOCTYPE CPKG [
<!ENTITY cicsparms SYSTEM "cics.parms">
<!ENTITY c370parms SYSTEM "c370.parms">
]>
<!-- The package unit which defines input and outputs -->
<CPKG NAME="cicspart" TYPE="c390cics">
    <CLANG NAME="c390cics">
    <OBJ>cicspart.obj</OBJ>
    <LIST>cicspart.lst370</LIST>
    <OUT1>cicspart.lstcics</OUT1>
    <OUT2>cicspart.lst</OUT2>
    <!-- The parameters to be passed to the different
    builder steps defined in the language -->
    <PARM1>NOS NSEQ </PARM1>
    &cicsparms;
    <PARM2> SOURCE RENT LONGNAME SHOWINC NOSEQUENCE
    </PARM2>
        &c370parms;
    </CPKG>
```

The related Language cics370.lang can be defined in a general fashion using variables in their definition. By providing a variable definition, member languages may be created from reusable parts in a plug together fashion.

The language is then a collection of predefined building

EXAMPLE 10

```
<!DOCTYPE LANG[
<!ENTITY includes SYSTEM "c_include.libs">
<!ENTITY parsec SYSTEM "parse_c.step">
<!-- parameters for cics preprocessor step building block -->
<!ENTITY IOTYPE_SYSIN "S">
<!ENTITY DD_SYSIN "CICIN">
<!ENTITY KEYREF_SYSIN "SINC">
<!ENTITY DD_SYSPRINT "CICPRINT">
<!ENTITY KEYREF_SYSPRINT"">
<!ENTITY RECFM_SYSPRINT "VBA">
<!ENTITY LRECL_SYSPRINT "137">
<!ENTITY RECNUM_SYSPRINT "35000">
<!ENTITY KEYREF_SYSPUNCH "">
<!ENTITY DD_SYSPUNCH "CICPUNCH">
<!ENTITY RECFM_SYSPUNCH "FB">
<!ENTITY LRECL_SYSPUNCH "80">
<!ENTITY RECNUM_SYSPUNCH "80000">
<ENTITY cicspre SYSTEM "cics.step">
<!-- parameters for cics compile step building block -->
<!ENTITY DD_COMPUNCH "&dd_syspunch;">
<!ENTITY DD_ALL "DD_ALL">
<!ENTITY c370comp SYSTEM "c370.step">
<!-- parameters for listing joiner building block -->
<!ENTITY DD_lst_cpre "&dd_sysprint;">
<!ENTITY DD_lst_comp "&dd_all">
<!ENTITY packlst SYSTEM "packlst.step">
]>
<LANG NAME="c370cics" env="MVS" Version_id="3.3.0">
<!-- include library chain used in the language in different steps -->
    &includes;
    <!-- steps active during the parse of parts related to a
package -->
    &parsec;
    <!-- steps active during the build of package -->
    &cicspre;
    &c370comp;
```

-continued

```
    &packlst;
</LANG>
```

Central building blocks like parser and build steps provided by a central build team can be reused to create several languages which just differ in the number of steps or different parameters.

The include building block is c_include.libs:

EXAMPLE 11

```
<INCLUDES ID="hfiles">
    <INCLUDE LIB="YES" TYPE="H"/>
    <INCLUDE LIB="YES" TYPE="H_P"/>
    <INCLUDE LIB="YES" TYPE="H_USER"/>
    <INCLUDE PATH="SYS1.CICS.SDFHC370" LIB="NO" />
    <INCLUDE PATH="SYS1.CICS.SDFHMAC" LIB="NO" />
</INCLUDES>
```

A parsing step building block is parse c.step:

EXAMPLE 12

```
<STEP TYPE="PARSE">
    <SCRIPT NAME="parse_c"/>
    <PARMS> -SOURCE ##source## -IDIRS ##incls## -DEPFILE
##deps##</PARMS>
    <FILE ID="source" KEYREF="SINC" IOTYPE="S" />
    <FILE ID="incls" REFID="hfiles" IOTYPE="I" />
    <FILE ID="deps" NAME="csource.deps" IOTYPE="W" />
</STEP>
```

The CICS preprocessor step building block definition is cics.step:

EXAMPLE 13

```
<!-- CICS Precompile -->
<STEP TYPE="BUILD">
    <SCRIPT CALLENV="ATTACHPGM" NAME="DFHEDP$"
        DDLIST="YES"/>
    <PARMS PARMKWD="PARM1"></PARMS>
    <RC COND="<="val="4"/>
    <DD IOTYPE="N"> </DD>
    <DD IOTYPE="N"> </DD>
    <DD IOTYPE="N"> </DD>
    <DD IOTYPE="N"> </DD>
    <!--SYSIN Input to be compiled -->
    <DD IOTPYE="&IOTYPE_SYSIN." DDNAME="&DD_SYSIN."
KEYREF="&KEYREF_SYSIN."></DD>
    <!-- SYSPRINT Listing from the precompile -->
    <DD IOTYPE="O" DDNAME="&DD_SYSPRINT."
KEYREF="&KEYREF_SYSPRINT." RECFM="&RECFM_SYSPRINT."
LRECL="&LRECL_SYSPRINT." RECNUM="&RECNUM_SYSPRINT."> </DD>
    <!-- SYSPUNCH -->
    <DD IOTYPE="O" DDNAME="&DD_SYSPUNCH."
KEYREF="&KEYREF_SYSPUNCH."
        RECFM="&RECFM_SYSPUNCH." LRECL="&LRECL_SYSPUNCH."
RECNUM="RECNUM_SYSPUNCH"></DD>
</STEP>
```

The C compile step building block is c370.step:

EXAMPLE 14

```
<!-- C Compile -->
<STEP TYPE="BUILD">
    <SCRIPT CALLENV="ATTACHPGM" NAME="EDCCOMP"
    DDLLST="YES"/>
    <PARMS PARMKWD="PARM2"></PARMS>
    <RC COND="<=" val="4"/>
    <!-- SYSIN -->
    <DD IOTYPE="U" DDNAME="&DD_COMPUNCH."> </DD>
    <!-- SYSLIN -->
    <DD IOTYPE="O" RECFM="FB" LRECL="80"
    RECNUM="9999" DDNAME="SYSLIN" KEYREF="OBJ"> </DD>
    ...
</STEP>
```

The process to merge listing outputs to one output is named "packlst.step."

EXAMPLE 15

```
<!-- Merge Listings to one LIST data set -->
<STEP>
    <SCRIPT CALLENV="ISPFREXX" NAME="PACKLST" DDLIST="NO"/>
    <PARMS PARMKWD="PARM3">&dd_lst_comp; &dd_lst_cpre;
    (APPEND(&dd_lst_comp;)></PARMS>
    <RC COND="<=" val="0"/>
    <DD> IOTYPE="O" DDNAME="&dd_lst_comp;" KEYREF="OUT2"
RECFM="VBA" LRECL="137" RECNUM="500000"></DD>
</STEP>
```

Logic Project View Hierarchy and Workflow

Figure 6:
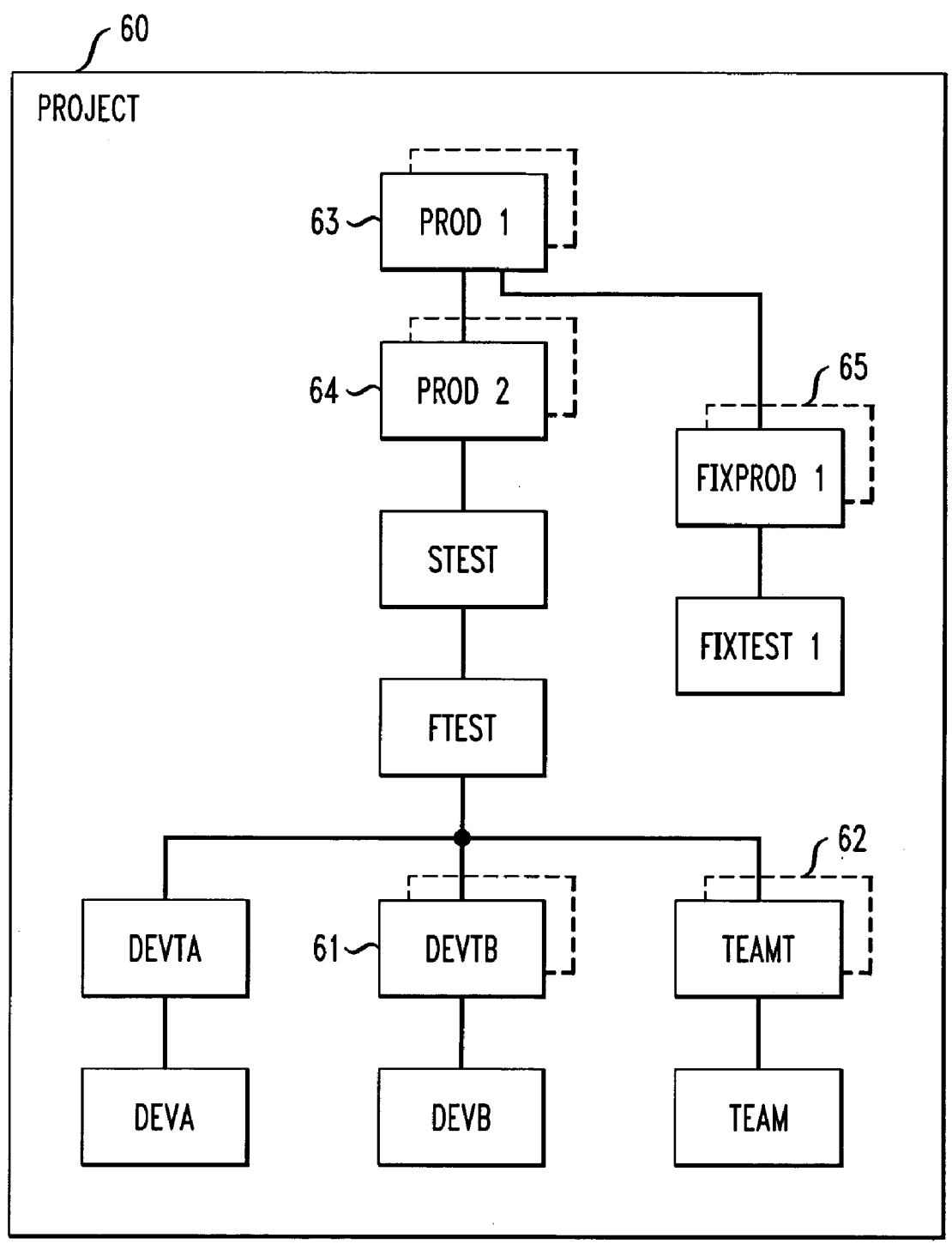
FIG. 6 is a block diagram of the logical project view hierarchy of a software project which is developed and tested by using a method and system according to the invention.

FIG. 6 shows the logical element hierarchy and data flow 60 of a complex project related to a first and a second version of a product. Each block in FIG. 6 represents a data unit. The development of a product starts on the low level in groups DEVA, DEVB and TEAM. These groups represent the editable data units where elements may be created, modified or updated. Each of the units DEVA and DEVB is assigned to a single user, while unit TEAM is assigned to a team of users. The next higher blocks DEVTA, DEVTB and TEAMT are assigned to the test of the elements from DEVA, DEVB and TEAM. No modifications of the product elements are permitted in the test level. The next higher levels represent a function test FTEST and a system test STEST of the second version of the product resulting from the elements treated and tested on the lower levels. At this point of time, the first version of the product PROD1 is already completed and shipped to customers. Errors which are found after the shipment are fixed and the subject of a test FIXTEST1 and followed by an integration into corrected product FIXPROD1.

Parallel to these activities, the second version of the product package PROD2 is finished after the completion of the system test STEST. The access to the elements in the local storage of the clients 25, 27, the access to the intermediate packages and the final product in the database 24, and the linking between these components is controlled by the XSCML processor 22, while for the treatment of the contents of these components different languages such as REXX, C++, JAVA or PEARL may be used. The block DEVTB comprises a subblock 61 which represents delta elements of DEVTB data. This does permit an undone step if required by replacing processed data by the previous data. The blocks TEAMT, PROD1, PROD2 and FIXPROD1 have corresponding subblocks 62, 63, 64 and 65.

Figure 7:
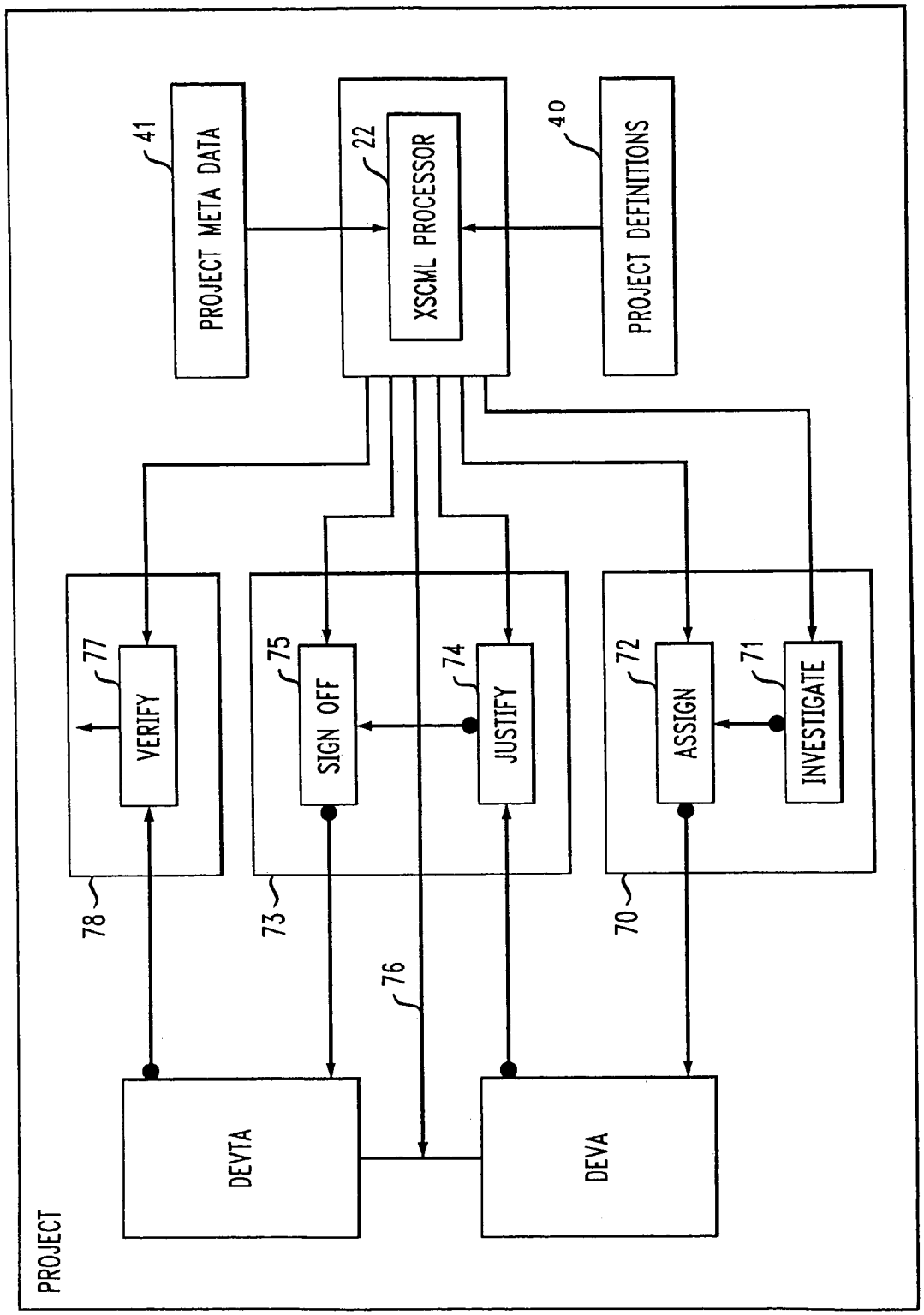
FIG. 7 is a subsection of a logical project view hierarchy showing the combination with a defined process flow.

FIG. 7 shows a section of the process flow of the project according to FIG. 6 in more detail. By using the project meta data 41 (FIG. 4A), the XSCML processor 22 controls, in an edit subsection 70, step 71 to investigate the validity and correctness of the project data and step 72 to assign the project to the development unit DEVA. The result of the editing process, which may be a product element, is treated in an evaluation subsection 73 wherein in step 74 the result of DEVA is justified and signed off in step 75. As indicated by arrow 76, the XSCML processor 22 controls the move of the result of DEVA to DEVTA where it is tested by means of step 77 in a test section 78 of the data flow.

The access rules to level and to actions are also defined via the XSCML syntax as part of the project definitions 40 shown in a simplified Example 16 which would be a part of Example 1:

EXAMPLE 16

```
...
<ACCESS>
    <USER>
    <NAME> Smith, Joe
    <USERID> JOE
    ...
    <ACTION TYPE="LANG" NAME="CPP" RULE="..."/>
    </USER>
    <USERGROUP NAME="Developers">
        <USERIDS> JOE </USERIDS>
    </USERGROUP>
    <LEVEL NAME="DEVA DEVTA" USERIDS="JOE" ACCESS="UPDATE"
        <ACTION TYPE="PROMOTE" RULE="..."/>
    </LEVEL>
    <LEVEL NAME="TEAM TEAMT" USERGROUPS="Developers"
    </LEVEL>
    <TYPE NAME="CPP" USERIDS="JOE" ACCESS="READ"
        <ACTION TYPE="UPDATE" RULE="..."/>
    </TYPE>
    <TYPE NAME="*" USERIDS="JOE" ACCESS="UPDATE"
        <ACTION TYPE="UPDATE" RULE="...."/>
    </TYPE>
</ACCESS>
```

Those access rules are on top of built-in access rules of the XSCML system. The main goal is to ensure integrity and control of the data managed in an XSCML system. The level of access definition is not part of the invention but only the principle to provide this information also via the process definition syntax.

It follows an example of a process flow definition as part of the project definition Example 1:

EXAMPLE 17

```
...
<PROCESSFLOW>
    <PROCESS STEP="Investigate" NEXT="Assign" INITIAL>
        <ACTION PGM="IJK">
    </PROCESS>
    <PROCESS STEP="Assign" NEXT="Justify">
        <LEVEL NAME="DEV%">
            <ACTION PGM="ABC" PARM="A B C" />
        </LEVEL>
        <LEVEL NAME="TEAM">
            <ACTION PGM="ABC" PARM="O P J" />
        </LEVEL>
    </PROCESS>
    <PROCESS STEP="Justify" NEXT="Sign Off">
    ...
    </PROCESS>
    <PROCESS STEP="Sign Off" NEXT="Verify">
        <LEVEL NAME="DEV%T">
            <ACTION PGM="ABC" PARM="A B C" />
        </LEVEL>
        ...
    </PROCESS>
    <PROCESS STEP="Verify" NEXT="...">
        ...
    </PROCESS>
</PROCESSFLOW>
```

The process flow may be more complex like a state machine with branches, loops and self references defined by the XSCML syntax and not only straight forward processes as the Example 17 shows.

Figure 8:
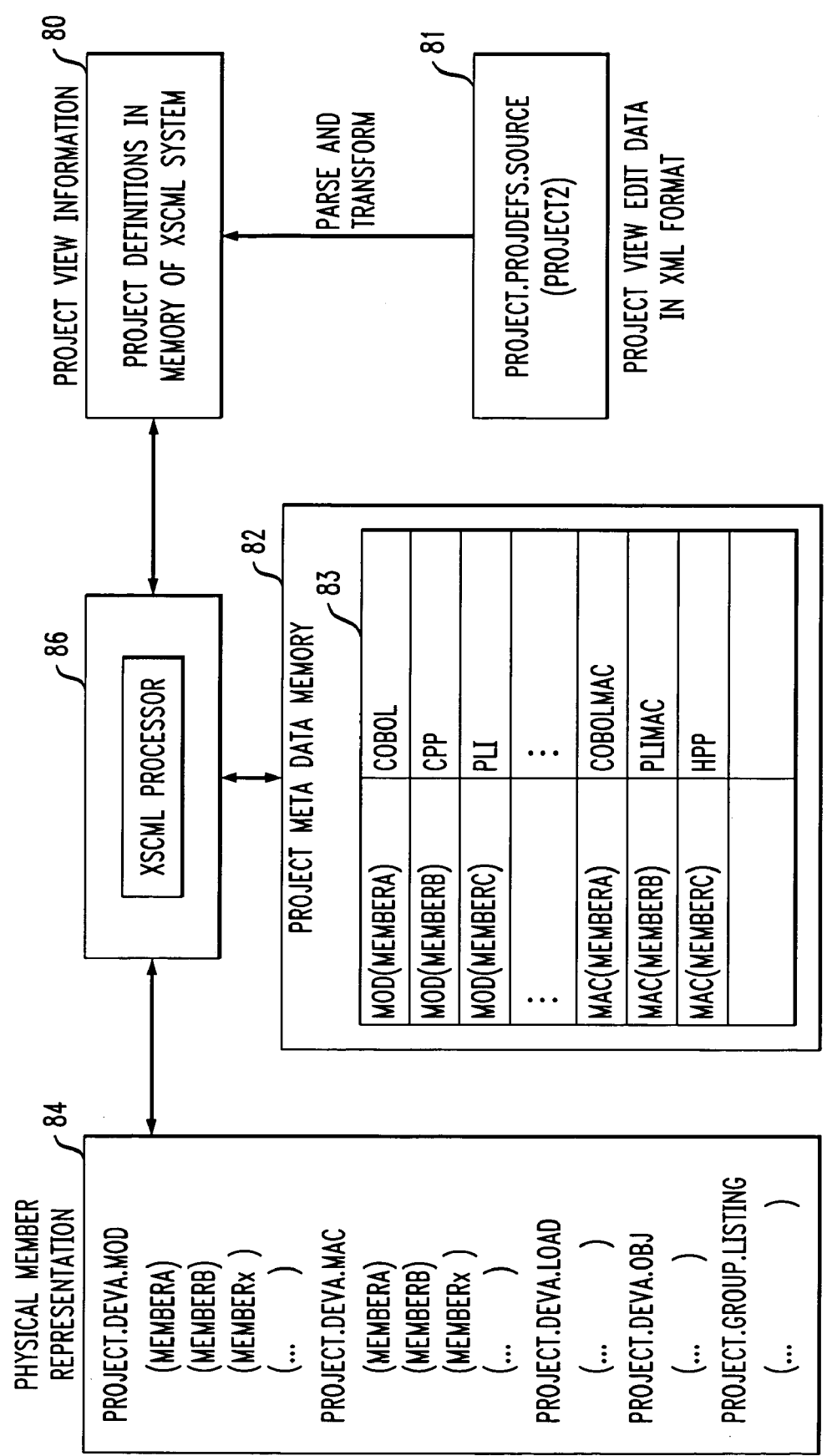
FIG. 8 is a physical member representation of a project which is developed and tested by using the system of FIG. 4.

FIG. 8 relates to the physical representation of the product elements of a project and their definitions as stored in the sections 42 and 43 of the database 24. In FIG. 8, a block 80 includes the project definition. This block corresponds to section 45 of the database (FIG. 4A). Project view edit data 81 including the project model source is parsed, transformed and assigned to the project definition data. A block 82 comprises the project meta data including project status data and element relations and package relations. The project status data also specifies the language of the elements which is shown in block 83 for the model elements A, B and C which are written in COBOL, CPP and PLI, respectively, and also for the macro elements A, B and C which are written in COBOLMAC, PLIMAC and HPP, respectively. The blocks 82 and 83 correspond to section 41 of the database. A block 84 which corresponds to the sections 42 and 43 of the database comprises a plurality of project groups each including all elements of a certain category. Element categories are "module," "makro," "load," "object code" or "code listings." The XSCM processor 22 of FIGS. 4A and 4B is represented in FIG. 8 by block 86 and receives project view information from the project definitions 80 and controls the access to the elements indicated shown in block 84.

Figure 9:
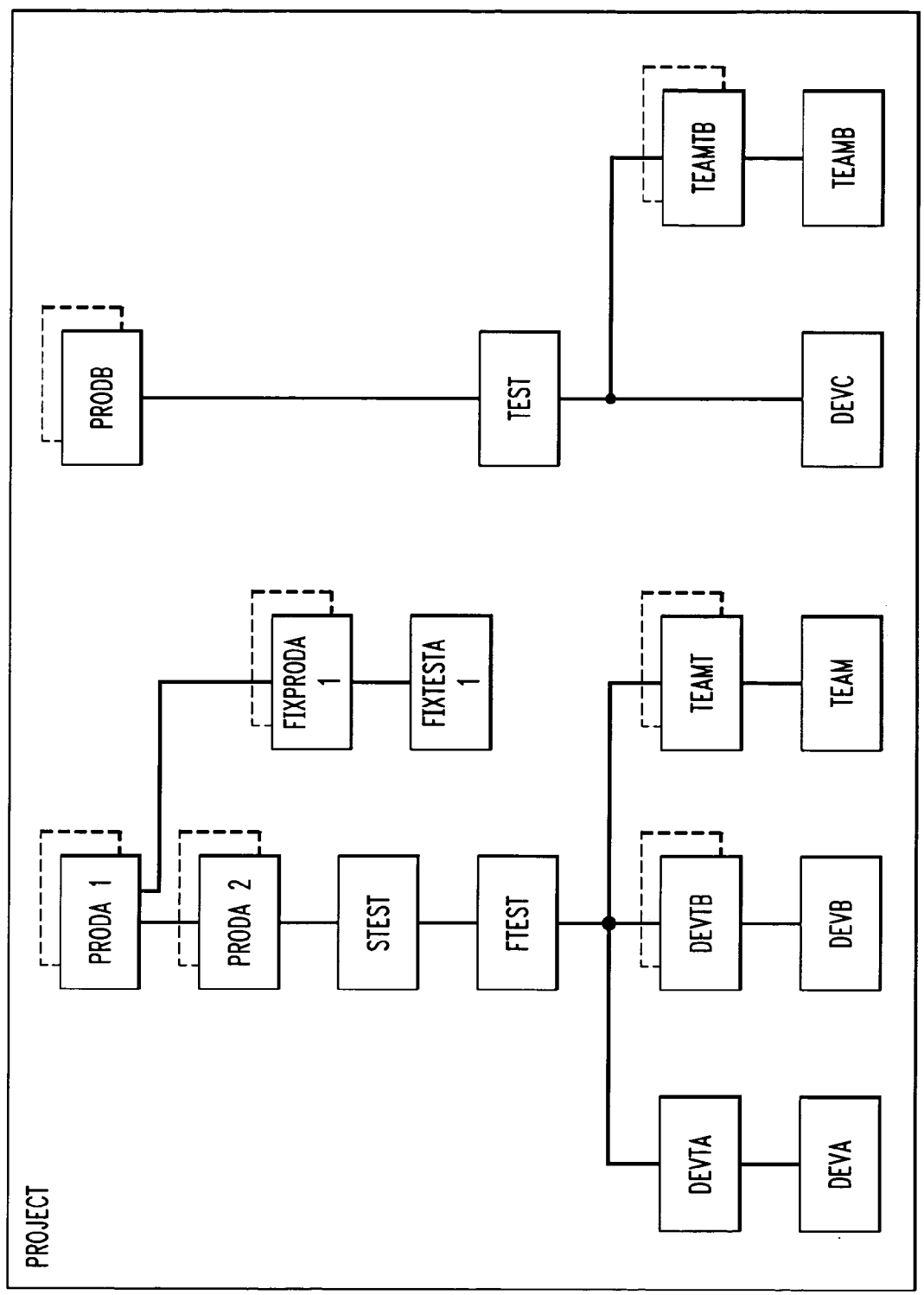
FIG. 9 is a block diagram of the logical project view with multiple hierarchies.

FIG. 9 shows the logical element hierarchy and workflow of a complex project comprising multiple hierarchies for two different products A and B which may be developed in the same location by separate teams of developers who are working in parallel. For both projects A and B, the same software configuration framework is used under the control of the XSCML processor 22 as described with reference to the FIGS. 6 and 7. The structure of the hierarchy relationship between the blocks shown in FIG. 9 corresponds to that described in connection with FIG. 6.

Figure 10:
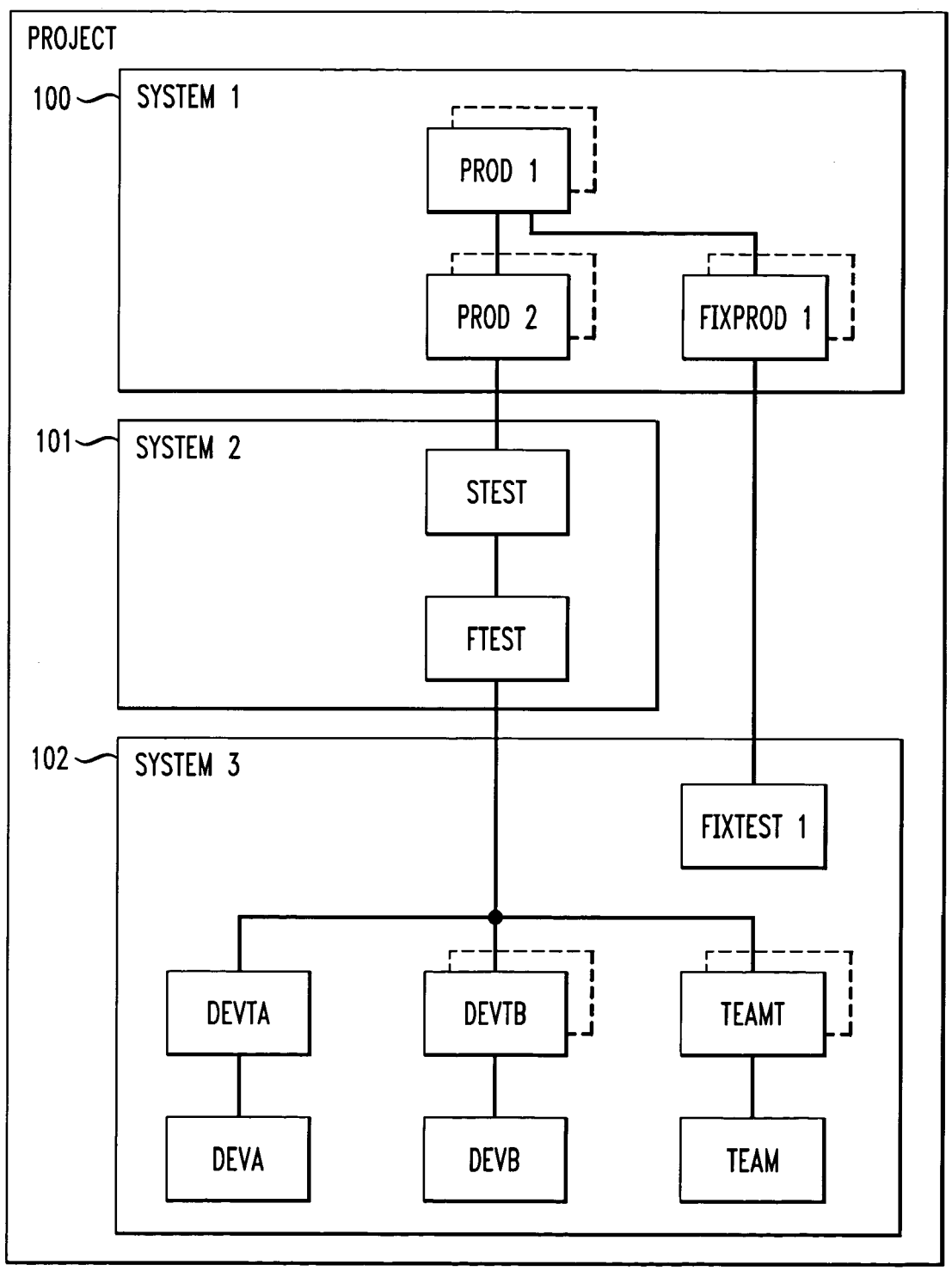
FIG. 10 is a block diagram of the logical project view of a software project which is developed and tested by using the distributed systems according to FIG. 3.

FIG. 10 shows the logical element hierarchy and workflow of a complex project which is produced by a distributed development by means of distributed computer systems 1, 2 and 3 designated in FIG. 10 by blocks 100, 101 and 102. As already described in connection with Figure 3, these systems may be located a far distance from each other. Each of the systems 100, 101 and 102 comprises a first server 20 including an XSCML processor 22 and a database 24 and preferably a second server 27 (FIG. 2) for supporting build operations. System 102 comprises the edit section with the units DEVA, DEVB and TEAM which correspond to DEVA, DEVB and TEAM in FIG. 6. Furthermore, system 102 comprises the edit test section with the units DEVTA, DEVTA and TEAMT which correspond to DEVA, DEVB and TEAMT in FIG. 6. System 102 also performs the test of fixes by FIXTEST1 of the first version of the product which corresponds to FIXTEST1 in FIG. 6. System 101 performs the functions test FTEST and the system test STEST of the second version of the same product corresponding to the FTEST and STEST in FIG. 6. In system 100, the product versions PROD1 and PROD2 are administrated according to PROD1 and PROD2 in FIG. 6. System 100 also performs the test of fixes FIXPROD1 of the first version according to FIXPROD1. The data flow in the systems 100, 101 and 102 corresponds to the data flow in the system shown in FIG. 6. In each of these systems, the data flow and the processes are controlled by the local XSCML processor.

Figure 11:
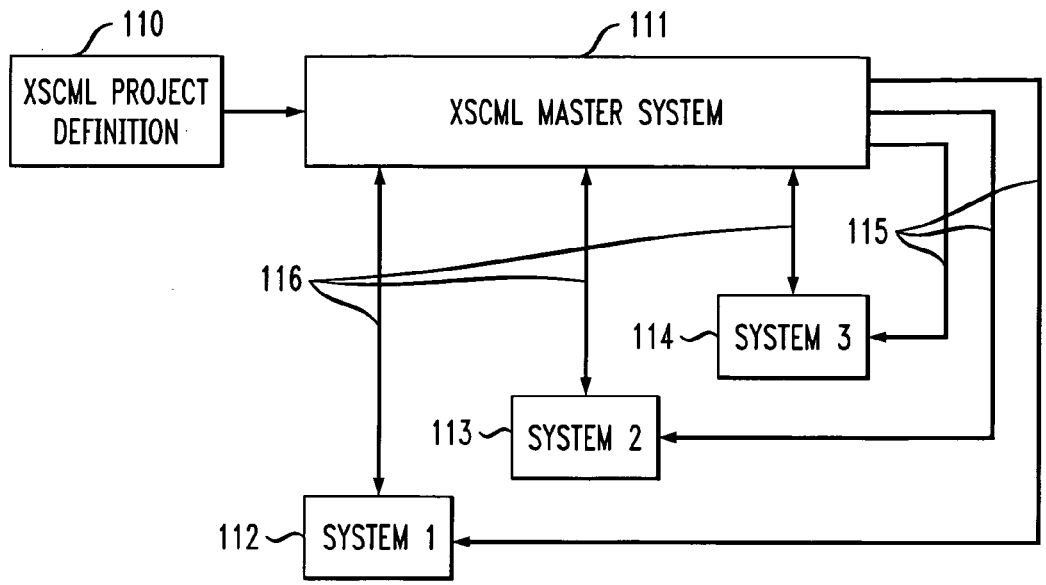
FIG. 11 is a block diagram of the project activation process for the cooperation of the distributed systems according to FIG. 3.

As shown in FIG. 11, a project model 110 defined in the XSCML syntax is loaded into a master system 111 which may be a separate system or one of the systems 112, 113 and 114. As a first step, the XSCML processor 22 of the master system 111 performs a parsing and validating of the model loaded and checks the model on integrity. Copies of the model are then transferred through connections 115 to the local database 24 of each of the systems 112, 113 and 114 where the model is locked. The connections 115 may be established via a communication network 34 such as the Internet or an Intranet. The locked models in the databases of the systems 112, 113 and 114 are then activated by commands on connection 116 which also may include the communication network to synchronize the systems with a new or updated model with a fallback possibility.

Figure 12:
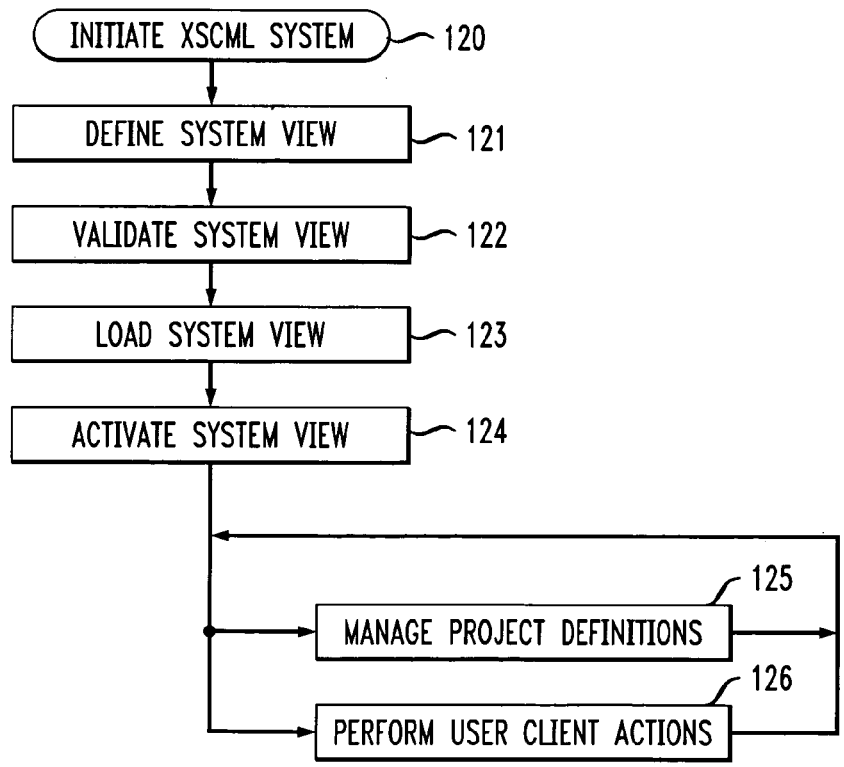
FIG. 12 is a flow diagram of a process to initiate an XSCML system according to the invention.

FIG. 12 shows the steps to initiate the XSCML system in a distributed environment according to FIG. 11. In one of the systems 1, 2 or 3, a client starts the initiation process as indicated by step 120 to carry out a project. In step 121, the project definition, herein also called system view, is defined by creating the project definition via XSCML tags to describe the data flow through a logical element view based on a file system or object model system. This step includes a mapping to the memory of the XSCML processor system. The project definitions also include the process flow, the process definitions and the client access rights to data and processes. Furthermore, the project definition also determines which of the distributed systems will be selected to be the master system. The creation is performed by using XSCML tags directly or by means of an XSCML tag editor. In step 122, the system view is validated. For this purpose, the initiating client passes the project definition to the XSCML processor of the master system. The XSCML processor of the master system is the administrator interface to the clients of distributed XSCML systems. The XSCML processor of the master system validates the project definition for correctness including a check of the tags on correctness and a check on the consistency of the definitions. In cases when errors are found, the client has to correct the project definition until the validation confirms the project definition. Step 123 performs a loading of the validated system view in the XSCML processors of the distributed systems. The XSCML processor of the master system first ensures that the validation step is successfully performed and then stores the project definition in the database assigned to the XSCML processor of the master system. The stored format may be different to the tag format but follows a one-to-one mapping. For the distributed systems, the project definition or relevant sections thereof are passed to the XSCML processors of the distributed systems for local validation. If the local validation is successful, the project definitions are stored in the local system and locked, where each system may store the related definitions in its proprietary format with a one-to-one mapping relation of the tags based definition. The master system controls the correctness of all local system validations before the next step can be done. If more than one system view is defined, the system views are checked against each other for consistency.

Step 124 activates the stored system view. The initiating client requests the XSCML processor of the master system to activate the project definitions stored there. The activation includes a preparation of the physical environment as defined in the project definition. The process may involve the creation of files and databases and an update of the security system related to them. For the distributed systems, the master system initiates the activation of the involved distributed systems which will prepare their environment as defined in their stored and locked project definitions. If all systems indicate the successful activation, the lock of the project definitions is taken away. The local client is then enabled to work on the project as defined in the project definitions which work may involve to manage the project definitions in step 125 and to perform user client actions by step 126.

Figure 13:
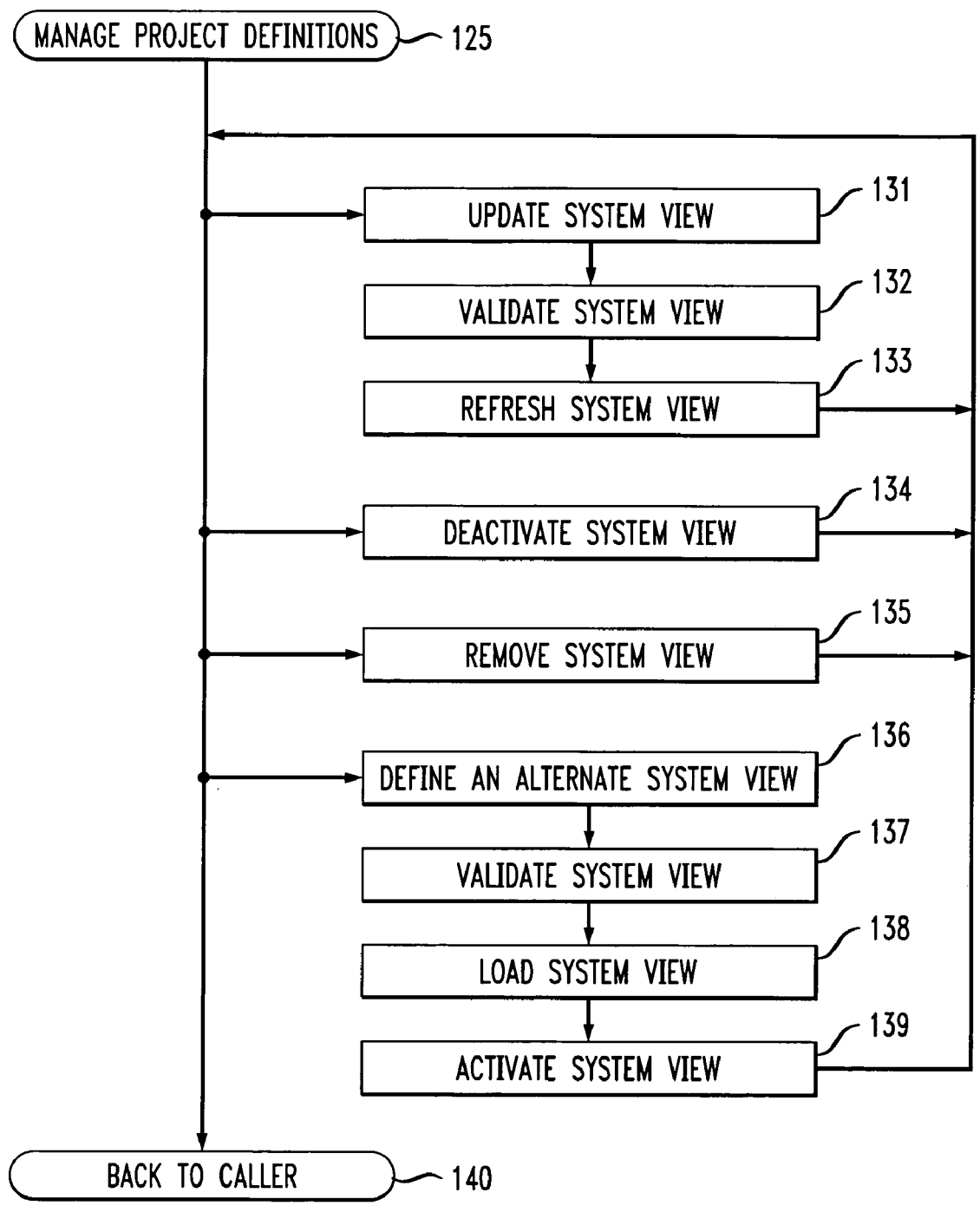
FIG. 13 is a flow diagram of a process to manage project definitions according to the invention.

Step 125 is shown in more detail in FIG. 13. It includes a system view update step 131 to implement changes of an existing project definition by a client request to retrieve from the XSCML processor of the master system the current project definition. That XSCML processor returns this project definition in the tag format and locks it in the update mode. The client may then do all actions provided by the system view definition step 121. Step 131 is followed by a new validation step 132 as described above after which a refresh system view step 133 is performed which sends the validated updates of the project definition to the XSCML processor of the master system. The XSCML master processor ensures that the changed project definition is loaded and activated in the same way described above for the steps 123 and 124. Dependent on the capability of the XSCML master processor, a delta format of the project definition may be kept to allow a reproduction of the project definition before it was updated. Further steps shown in FIG. 13 include step 134 for deactivation of a system view so that client actions can temporarily not be performed, and step 135 for a complete removal of a system view so that it can not be used anymore. Step 125 also includes the definition of an alternate system view by step 136 which is followed by steps 137, 138 and 139 to validate, load and activate the alternate system view. Step 140 brings the control back to the calling client.

Figure 14:
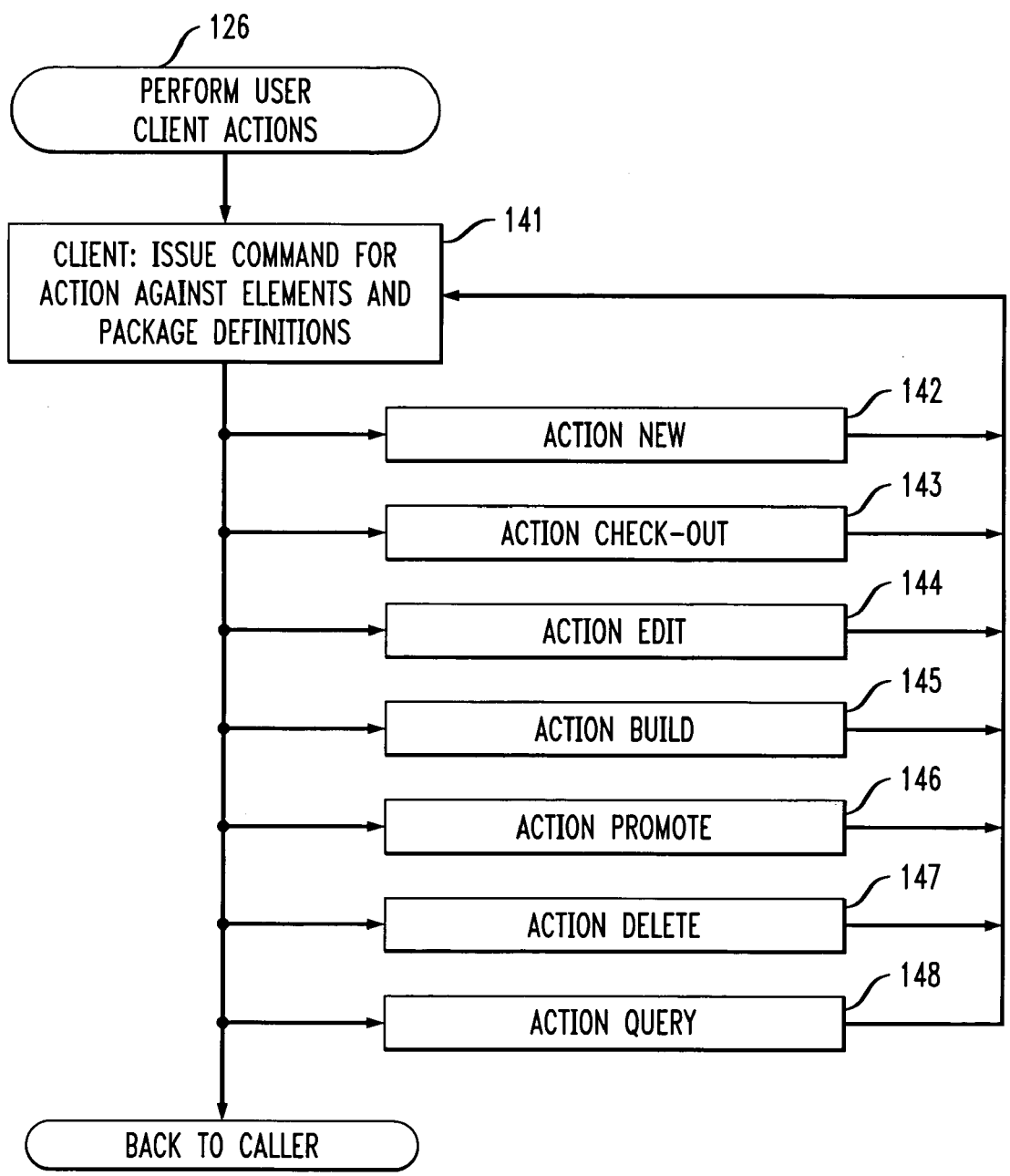
FIG. 14 is a flow diagram of a process to perform user client actions according to the invention.

FIG. 14 shows client actions of step 126. A client can issue an action command which activates at least one of the actions New, Check-out, Edit, Build, Promote, Delete or Query which are designated 142–148. To execute the action New, the XSCML processor uses the project definition and the meta data to set up and store a new element in the package and in the element memory on the edit group level. Simultaneously, the related meta data is updated. At least on language as defined in the meta data must be specified. A number of actions may be requested and carried out during this step according to the actions indicated in the process definitions associated to that element.

To execute the action Check-out, the XSCML processor uses the project definition and the meta data to prepare an access to the package or element in its edit group and to set a lock to ensure an exclusive use of the package or element by that client. Based on the process definitions associated to that package or element, a number of actions may be requested and carried out during this step. The client may modify the package or element independent of the XSCML processor, and may select among the actions Save, Save-as, or check-in (close).

To perform the action Save, the XSCML processor uses the project definition and the meta data to store the modified package or element in the package memory 43 or input element memory 44 (FIG. 4A) on the edit group level, and to update the related meta data. The action Save-as is similar to Save except that form an existing element or package a new element or package is created and stored under a new name and with the same XSCML properties of the existing element or package. Also the action Check-in is similar as Save except that the element or package is unlocked so that is accessible again by other clients.

The action Edit 144 involves a check-out for the element or package to be edited and then calls an editor which has XSCML support built-in to edit an element of package in an edit group. The editor calls the XSCML actions New, Check-out, Save, Save-as, Check-in whenever appropriate edition functions are used by the client. The edition used is defined in the project definition and may be related to the type of an element or package. The edited Check-out element of package is checked-in by the XSCML processor.

To initiate a Build action 145, the XSCML processor uses the project definition and the meta data to determine if the type of the package to be build is "C," "L" or "HL." In case of a "C" type, the XSCML processor determines the related sources, parameters, process definition, outputs to be stored and the files needed for the Build action. It determines the status of the involved files and information needed for the Build action if it was changed by a previous Build action. If any changes are found, it transmits the complete build information to the defined build server 27 to execute "C" package Build action. The build server receives the build information for a package which contains input, parameter and output information and defines the build steps to be executed and the files needed for these steps. The build server does the allocation of the files needed and gets access to the sources needed to start the defined build action for the step to be executed.

The build server stores all output elements indicated in the process definition back to the generated element memory. It also updates the meta data for the generated elements and creates a build information to contain the list of inputs generated elements and the dependencies and used parameters. The build server stores all outputs indicated in the process definition to user files for the build and error analysis in case that at least one build step failed.

In case of a "L" type, the XSCML processor performs the action Resolve Build references to packages which scans the package for references to other build packages and issues a new action Build for each referenced build package which is not yet checked for a Build. Thereafter, the XSCML processor determines the related outputs as generated by the referenced packages to be used as input to the build process, further the parameters, process definition, outputs to be stored, and files needed for the Build action. Before the "L" package Build action is started, a check is made for the referenced packages generating the elements to be used as input if a rebuild is needed. It determines the state of the involved files and information needed for the build if it changed from a successfully executed previous build. In this case, no build request is issued. If any changes are found, it transmits the complete build information to the defined build server to execute the "L" package Build.

In case of an action Build for an "HL" type package, the XSCML processor performs the action Resolve Build references to packages.

To execute the action Promote 146, the XSCML processor uses the project definition and the meta data to determine the elements and packages referenced to the package to be promoted and if they are located in the promote group from where the Promote action is issued. It also determines the group to which the promotion shall take place and their location. The Promote action creates copies of all referenced elements and packages to the next higher group and deletes them in the current group. The Promote action only moves successfully build packages. In a distributed environment, a communication between the XSCML processors of the distributed systems takes place to synchronize their memories.

To execute the action Delete 147, the XSCML processor uses the project definition and the meta data to determine the elements and packages to be deleted. To execute the action Query 148, the XSCML processor uses the project definition and the meta data to determine the elements and packages to the specified query to determine the information. The Query action allows an extensive retrieval of information stored in the packages, elements, project definitions and meta data.

While the invention is described with reference to various embodiments and examples, modifications or other embodiments of the invention are within the scope of the invention as defined in the claims.

What is claimed is:

1. A method of configuring software, the method comprising the steps of:
    utilizing a common software configuration markup language in one or more integrated computer systems of a digital communication network, the one or more integrated computer systems comprising at least one server which is connected to a plurality of client computers, the server having a memory for storing product elements which may be linked together to form at least one version of a software package, and further for storing processes usable by the clients to at least one of maintain the product elements and develop new product elements, and tools usable by the clients to at least one of define, maintain and update relations between product elements;
    wherein the common software configuration markup language is useable by a cooperating team on the plurality of client computers to define a project, perform a memory access to at least one of product elements and packages, map one or more of the processes and tools to one or more library systems, and define relations between the product elements, allowing for platform independent editing of product elements at individual client computers in at least one language independent of the common software configuration markup language to form different versions of a software package.

2. The method of claim 1, further comprising at least one of the steps of:
    generating and storing a project definition which defines data flow, process flow and process definition of a project by using the common software configuration markup language;
    generating and storing the software configuration framework by using the project definition and the process definition to describe the product elements and processes and define their access parameters and their relations;

mapping of the product elements, processes and tools to the one or more library systems by using the common software configuration markup language;

storing the product elements, processes and tools in the memory of the at least one server;

assigning the product elements, processes and tools in storage to the software configuration framework; and calling selected ones of the product elements, tools and processes by at least one of the clients using commands of the common software configuration markup language, whereby another programming language may be used to at least one of develop, update and test the contents of the product elements called.

3. The method of claim 2, wherein the storing step comprises the step of storing the system-independent software configuration framework in memories of a plurality of geographically distributed computer systems which are connected together through a communication network, and wherein the assigning step comprises the step of assigning the product elements, processes and tools to the system-independent software configuration framework in the memories of each of the distributed computer systems.

4. The method of claim 3, wherein each of the distributed computer systems generates commands in the common software configuration markup language by a control program which is part of the software configuration framework.

5. The method of claim 3, further comprising the steps of editing product elements in each of the distributed systems by using a first server which is connected to a locally installed database, and building packages by a second server connected to the database.

6. The method of claim 3, wherein the calling step comprises calling elements, tools and processes by at least one of the clients attached to the servers in each of the distributed systems, and editing the elements by using one of same and different programming languages which are independent of the common software configuration markup language.

7. The method of claim 3, further comprising the step of transferring changes of the product elements, which result from processing of the product elements by each of the distributed systems, to the other distributed systems.

8. The method of claim 3, wherein one of the distributed systems is used as a master system, the memory of which contains project definition and process definition data in the common software configuration markup language, the data being used by a control program to initiate the software configuration framework.

9. The method of claim 1, wherein the common software configuration markup language is an extensible markup language.

10. The method of claim 1, wherein the common software configuration markup language is based on the Extensible Markup Language (XML).

11. The method of claim 1, further comprising the step of generating commands in the common software configuration markup language via a control program in the server, wherein the control program is part of the software configuration framework.

12. The method of claim 1, wherein the common software configuration markup language is used for defining a project to one of develop and update a software product in a first server via the steps of accessing project definition data and data on project states, user access rights and element relations in a database connected to the first server to set up the project, and repeatedly accessing and updating project status data in the database.

13. The method of claim 1, wherein the common software configuration markup language is used for preparing an edit action for product elements comprising the steps of invoking an editor to which the product and process definition, element states and relations among elements are provided by a control program in a first server, wherein the control program is associated with the software configuration framework, and accessing processes and tools in the database for one of developing new product elements and modifying and updating existing product elements by the control program.

14. The method of claim 13, wherein the editor uses a language which is independent of the common software configuration markup language.

15. The method of claim 1, wherein the common software configuration markup language is used for building packages of product elements in a second server, connected to a database, via the steps of accessing processes and tools in one of a memory of the second server and the database so as to compile and link product elements to form program packages.

16. The method of claim 1, further comprising the step of generating self-documenting product elements and packages of product elements, and updates thereof, via the common software configuration markup language.

17. Apparatus for configuring software, the apparatus comprising:

one or more processors operable to utilize a common software configuration markup language in one or more integrated computer systems of a digital communication network, the one or more integrated computer systems comprising at least one server which is connected to a plurality of client computers, the server having a memory for storing product elements which may be linked together to form at least one version of a software package, and further for storing processes usable by the clients to at least one of maintain the product elements and develop new product elements, and tools usable by the clients to at least one of define, maintain and update relations between product elements;

wherein the common software configuration markup language is useable by a cooperating team on the plurality of client computers to define a project, perform a memory access to at least one of product elements and packages, map one or more of the processes and tools to one or more library systems, and define relations between the product elements, allowing for platform independent editing of product elements at individual client computers in at least one language independent of the common software configuration markup language to form different versions of a software package.

18. The apparatus of claim 17, wherein the one or more processors are further operative to at least one of:

generate and store a project definition which defines data flow, process flow and process definition of a project by using the common software configuration markup language;

generate and store the software configuration framework by using the project definition and the process definition to describe the product elements and processes and define their access parameters and their relations;

map of the product elements, processes and tools to the one or more library systems by using the common software configuration markup language;

store the product elements, processes and tools in the memory of the at least one server;

assign the product elements, processes and tools in storage to the software configuration framework; and call selected ones of the product elements, tools and processes by at least one of the clients using commands of the common software configuration markup language, whereby another programming language may be used to at least one of develop, update and test the contents of the product elements called.

19. The apparatus of claim 18, wherein the storing operation comprises storing the system-independent software configuration framework in memories of a plurality of geographically distributed computer systems which are connected together through a communication network, and wherein the assigning operation comprises assigning the product elements, processes and tools to the system-independent software configuration framework in the memories of each of the distributed computer systems.

20. The apparatus of claim 19, wherein each of the distributed computer systems generates commands in the common software configuration markup language by a control program which is part of the software configuration framework.

21. The apparatus of claim 19, wherein the one or more processors are further operative to edit product elements in each of the distributed systems by using a first server which is connected to a locally installed database, and building packages by a second server connected to the database.

22. The apparatus of claim 19, wherein the calling operation comprises calling elements, tools and processes by at least one of the clients attached to the servers in each of the distributed systems, and editing the elements by using one of same and different programming languages which are independent of the common software configuration markup language.

23. The apparatus of claim 19, wherein the one or more processors are further operative to transfer changes of the product elements, which result from processing of the product elements by each of the distributed systems, to the other distributed systems.

24. The apparatus of claim 19, wherein one of the distributed systems is used as master system, the memory of which contains project definition and process definition data in the common software configuration markup language, the data being used by a control program to initiate the software configuration framework.

25. The apparatus of claim 17, wherein the common software configuration markup language is an extensible markup language.

26. The apparatus of claim 17, wherein the common software configuration markup language is based on the Extensible Markup Language (XML).

27. The apparatus of claim 17, wherein the one or more processors are further operative to generate commands in the common software configuration markup language via a control program in the server, wherein the control program is part of the software configuration framework.

28. The apparatus of claim 17, wherein the common software configuration markup language is used for defining a project to one of develop and update a software product in a first server via the steps of accessing project definition data and data on project states, user access rights and element relations in a database connected to the first server to set up the project, and repeatedly accessing and updating project status data in the database.

29. The apparatus of claim 17, wherein the common software configuration markup language is used for preparing an edit action for product elements comprising the steps of invoking an editor to which the product and process definition, element states and relations among elements are provided by a control program in a first server, wherein the control program is associated with the software configuration framework, and accessing processes and tools in the database for one of developing new product elements and modifying and updating existing product elements by the control program.

30. The apparatus of claim 29, wherein the editor uses a language which is independent of the common software configuration markup language.

31. The apparatus of claim 17, wherein the common software configuration markup language is used for building packages of product elements in a second server, connected to a database, via the operation of accessing processes and tools in one of a memory of the second server and the database so as to compile and link product elements to form program packages.

32. The apparatus of claim 17, wherein the one or more processors are further operative to generate self-documenting product elements and packages of product elements, and updates thereof, via the common software configuration markup language.

33. A software configuration system for the use in one or more integrated computer systems of a digital communication network, the one or more integrated computer systems comprising at least one server which is connected to a plurality of client computers, the server having a memory for storing product elements which may be linked together to form at least one version of a software package, and further for storing processes usable by the clients to at least one of maintain the product elements and develop new product elements, and tools usable by the clients to at least one of define, maintain and update relations between product elements, the system comprising:

means for storing a project definition which defines data flow, process flow and process definition of a project by using a common software configuration markup language which is adapted to serve as a meta syntax for defining a project and processes to perform the project, for mapping of the processes and tools to a database, and for accessing product elements in the database;

means for generating and storing a software configuration framework by using the project definition and the process definition to describe the product elements and processes and define their access parameters and their relations;

means for mapping of the product elements, processes and tools to one or more library systems by using the common software configuration markup language, and define relations between the product elements, allowing for platform independent editing of product elements at individual client computers in at least one language independent of the common software configuration markup language to form different versions of a software package;

means for storing the product elements, processes and tools in the memory of the at least one server;

means for assigning the product elements, processes and tools in storage to the software configuration framework; and means for calling selected ones of the product elements, tools and processes by at least one of the clients using commands of the common software configuration markup language, whereby another programming language may be used to at least one of develop, update and test the contents of the product elements called.

34. An article of manufacture for configuring software, the article comprising a machine readable medium containing one or more programs which when executed implement the steps of:
- utilizing a common software configuration markup language in one or more integrated computer systems of a digital communication network, the one or more integrated computer systems comprising at least one server which is connected to a plurality of client computers, the server having a memory for storing product elements which may be linked together to form at least one version of a software package, and further for storing processes usable by the clients to at least one of maintain the product elements and develop new product elements, and tools usable by the clients to at least one of define, maintain and update relations between product elements;
- wherein the common software configuration markup language is useable by a cooperating team on the plurality of client computers to define a project, perform a memory access to at least one of product elements and packages, map one or more of the processes and tools to one or more library systems, and define relations between the product elements, allowing for platform independent editing of product elements at individual client computers in at least one language independent of the common software configuration markup language to form different versions of a software package.

35. The article of claim 34, further comprising at least one of the steps of:
- generating and storing a project definition which defines data flow, process flow and process definition of a project by using the common software configuration markup language;
- generating and storing the software configuration framework by using the project definition and the process definition to describe the product elements and processes and define their access parameters and their relations;
- mapping of the product elements, processes and tools to the one or more library systems by using the common software configuration markup language;
- storing the product elements, processes and tools in the memory of the at least one server;
- assigning the product elements, processes and tools in storage to the software configuration framework; and
- calling selected ones of the product elements, tools and processes by at least one of the clients using commands of the common software configuration markup language, whereby another programming language may be used to at least one of develop, update and test the contents of the product elements called.

36. A method of configuring software, the method comprising the steps of:
- utilizing a common software configuration markup language in one or more integrated computer systems of a digital communication network, the one or more integrated computer systems comprising least one server which is connected to a plurality of client computers, the server having a memory for storing product elements which may be linked together to form at least one version of a software package, and further for storing processes usable by the clients to at least one of maintain the product elements and develop new product elements, and tools usable by the clients to at least one of define, maintain and update relations between product elements, wherein the common software configuration markup language is useable by a cooperating team on the plurality of client computers to define a project, perform a memory access to at least one of product elements and packages, map one or more of the processes and tools to one or more library systems, and define relations between the product elements, allowing for platform independent editing of product elements at individual client computers in at least one language independent of the common software configuration markup language to form different versions of a software package;
- generating and storing a project definition which defines data flow, process flow and process definition of a project by using the common software configuration markup language;
- generating and storing the software configuration framework by using the project definition and the process definition to describe the product elements and processes and define their access parameters and their relations;
- mapping of the product elements, processes and tools to the one or more library systems by using the common software configuration markup language;
- storing the product elements, processes and tools in the memory of the at least one server;
- assigning the product elements, processes and tools in storage to the software configuration framework; and
- calling selected ones of the product elements, tools and processes by at least one of the clients using commands of the common software configuration markup language, whereby another programming language may be used to at least one of develop, update and test the contents of the product elements called.

* * * * *